(12) United States Patent
Tian

(10) Patent No.: US 9,864,503 B2
(45) Date of Patent: Jan. 9, 2018

(54) TOUCH METHOD AND ELECTRONIC DEVICE

(71) Applicants: Beijing Lenovo Software Ltd., Beijing (CN); Lenovo (Beijing) Limited, Beijing (CN)

(72) Inventor: Jiangtong Tian, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 107 days.

(21) Appl. No.: 14/755,484

(22) Filed: Jun. 30, 2015

(65) Prior Publication Data

US 2016/0253025 A1    Sep. 1, 2016

(30) Foreign Application Priority Data

Feb. 28, 2015  (CN) .......................... 2015 1 0091695
Feb. 28, 2015  (CN) .......................... 2015 1 0091704
Feb. 28, 2015  (CN) ..................... 2015 2 0120810 U

(51) Int. Cl.
*G06F 3/0487*    (2013.01)
*G06F 3/0488*    (2013.01)
(Continued)

(52) U.S. Cl.
CPC ............ *G06F 3/0487* (2013.01); *G06F 1/169* (2013.01); *G06F 1/1626* (2013.01);
(Continued)

(58) Field of Classification Search
CPC .... G06F 3/0487; G06F 1/1626; G06F 3/0484; G06F 3/0488; G06F 2200/1637; G06F 1/1671; G06F 1/169
See application file for complete search history.

(56) References Cited

U.S. PATENT DOCUMENTS

2008/0062137 A1   3/2008  Brodersen et al.
2009/0302722 A1*  12/2009  Mihara ................. G06F 1/1616
                                                              312/223.2
(Continued)

FOREIGN PATENT DOCUMENTS

CN       102955660 A    3/2013
CN       103064596 A    4/2013
(Continued)

OTHER PUBLICATIONS

"从MX到MX2魅族独特Home按键的完美演变(图文)", http://www.chinadaily.com.cn/tech/2013-03/21/content_16329608.htm, (Mar. 21, 2013), 3 pgs.
(Continued)

*Primary Examiner* — Sahlu Okebato
(74) *Attorney, Agent, or Firm* — Schwegman Lundberg & Woessner, P.A.

(57) ABSTRACT

The disclosure provides a touch method applied in an electronic device and the corresponding electronic device. The electronic device has a first key arranged at a first position of the electronic device, and the first key is operable to respond to a first operation to control the electronic device to generate a first executable instruction based on the first operation for instructing the electronic device to display a first main interface through the first executable instruction. The method comprises: receiving a second operation via the first key when the electronic device displays a first interface of a first application program; judging whether the second operation satisfies a first preset rule to acquire a first judgment result; generating, according to the first judgment result, a second executable instruction based on the second operation; and controlling, according to the second executable instruction, the electronic device to perform an operation corresponding to the second executable instruction.

13 Claims, 12 Drawing Sheets

(a)

(b)

(51) Int. Cl.
*G06F 1/16* (2006.01)
*G06F 3/0484* (2013.01)

(52) U.S. Cl.
CPC .......... *G06F 1/1671* (2013.01); *G06F 3/0484* (2013.01); *G06F 3/0488* (2013.01); *G06F 2200/1637* (2013.01)

(56) References Cited

U.S. PATENT DOCUMENTS

| | | | | |
|---|---|---|---|---|
| 2010/0134966 | A1* | 6/2010 | Shimamoto | G06F 1/162 361/679.09 |
| 2011/0259724 | A1* | 10/2011 | Ku | G06F 1/1626 200/5 A |
| 2012/0326981 | A1* | 12/2012 | Kurose | G06F 1/1626 345/160 |
| 2014/0215340 | A1* | 7/2014 | Shetty | G06F 3/0488 715/727 |

FOREIGN PATENT DOCUMENTS

| | | |
|---|---|---|
| CN | 103076979 A | 5/2013 |
| CN | 103152465 A | 6/2013 |

OTHER PUBLICATIONS

"Chinese Application No. 201510091695.3, Office Action dated Apr. 26, 2017", w/ English Translation, (dated Apr. 26, 2017), 17 pgs.

"Chinese Application No. 201510091704.9, Office Action dated May 2, 2017", w/ English Translation, (dated May 2, 2017), 14 pgs.

\* cited by examiner (a)　　　　(b)

(a)          (b)

TOUCH METHOD AND ELECTRONIC DEVICE

CROSS-REFERENCE TO RELATED APPLICATION(S)

This application claims priority to Chinese Patent Application No. 201520120810.0, filed on Feb. 28, 2015, entitled "ELECTRONIC DEVICE", and claims priority to Chinese Patent Application No. 201510091695.3, filed on Feb. 28, 2015, entitled "TOUCH METHOD AND ELECTRONIC DEVICE", and claims priority to Chinese Patent Application No. 201510091704.9, filed on Feb. 28, 2015, entitled "TOUCH METHOD AND ELECTRONIC DEVICE" which applications are incorporated herein by reference in their entireties.

TECHNICAL FIELD

The present disclosure generally relates to touch technology, and in particular, to a touch method and an electronic device.

BACKGROUND

With development of modern technology, electronic devices have become an indispensable part of people's work and life. Generally, a particular physical key is arranged on an electronic device to adjust functional parameters of the electronic device. For example, the physical key may be a back key, a home key, a volume key or the like.

In order to arrange a plurality of physical keys in the electronic device, the electronic device generally needs to be punched in places where the physical keys are to be arranged. However, the intensity of the whole structure of the electronic device is reduced due to so many holes, thereby increasing the risk in a fault occurring in the electronic device, which thus reduces user experience.

In addition, in an example, a physical key may be arranged on the side of the electronic device, to control for example the volume of the electronic device. Conventionally, as the directions in which the volume is increased and reduced are fixed, when the electronic device is in different postures, a problem that the electronic device is not suitable or even not available for a user of the electronic device to operate when the user adjusts the volume may occur, which also significantly reduces the user experience.

In addition, a back key is generally arranged on the lower right of a display screen of the electronic device, for convenience of operation by the user of the electronic device. However, it is found in practical applications that the back key arranged on the lower right is often mis-operated by the user, which reduces the user experience.

SUMMARY

According to an aspect of the present disclosure, a touch method applied in an electronic device having a first key arranged at a first position of the electronic device is provided. The first key is operable to respond to a first operation to control the electronic device to generate a first executable instruction based on the first operation for instructing the electronic device to display a first main interface through the first executable instruction. The method comprises: receiving a second operation via the first key when the electronic device displays a first interface of a first application program; judging whether the second operation satisfies a first preset rule to acquire a first judgment result; generating, according to the first judgment result, a second executable instruction based on the second operation; and controlling, according to the second executable instruction, the electronic device to perform an operation corresponding to the second executable instruction.

In an embodiment, said controlling, according to the second executable instruction, of the electronic device to perform an operation corresponding to the second executable instruction comprises: controlling, according to the second executable instruction, the electronic device to exit the first interface or the first application program corresponding to the first interface, so that the electronic device returns to an upper-level interface corresponding to the first interface, or instructing, according to the second executable instruction, the electronic device to display the first main interface.

In an embodiment, said generating, according to the first judgment result, of a second executable instruction based on the second operation comprises: generating the second executable instruction based on the second operation when the first judgment result indicates that the second operation satisfies the first preset rule; and said controlling, according to the second executable instruction, the electronic device to perform an operation corresponding to the second executable instruction comprises: controlling, according to the second executable instruction, the electronic device to exit the first interface or the first application program corresponding to the first interface so that the electronic device returns to an upper-level interface corresponding to the first interface.

In an embodiment, said generating, according to the first judgment result, of a second executable instruction based on the second operation comprises: generating the second executable instruction based on the second operation when the first judgment result indicates that the second operation does not satisfy the first preset rule; and said controlling, according to the second executable instruction, the electronic device to perform an operation corresponding to the second executable instruction comprises: instructing, according to the second executable instruction, the electronic device to display the first main interface.

In an embodiment, the method further comprises: judging whether the first application program satisfies a second preset rule to acquire a second judgment result; wherein said generating, according to the first judgment result, a second executable instruction based on the second operation comprises: generating, according to the first judgment result and the second judgment result, the second executable instruction based on the second operation.

In an embodiment, said generating, according to the first judgment result and the second judgment result, the second executable instruction based on the second operation comprises: generating the second executable instruction based on the second operation when the first judgment result indicates that the second operation satisfies the first preset rule and when the first application program satisfies the second preset rule; and said controlling, according to the second executable instruction, the electronic device to perform an operation corresponding to the second executable instruction comprises: instructing the electronic device, according to the second executable instruction, to display the first main interface.

In an embodiment, the generating, according to the first judgment result and the second judgment result, of the second executable instruction based on the second operation comprises: generating the second executable instruction based on the second operation when the first judgment result indicates that the second operation satisfies the first preset rule and when the first application program does not satisfy the second preset rule; and the controlling, according to the second executable instruction, of the electronic device to perform an operation corresponding to the second executable instruction comprises: controlling, according to the second executable instruction, the electronic device to exit the first interface or the first application program corresponding to the first interface, so that the electronic device returns to an upper-level interface corresponding to the current first interface.

In an embodiment, the judging of whether the second operation satisfies a first preset rule to acquire a first judgment result comprises: acquiring first data information corresponding to the second operation, the first data information representing data information corresponding to movement parameters of the second operation; detecting current first posture information of the electronic device; and acquiring the first judgment result based on the first data information and the first posture information; and the controlling, according to the second executable instruction, of the electronic device to perform an operation corresponding to the second executable instruction comprises: adjusting, according to the first judgment result, a first functional parameter of the electronic device, so that the adjusted first functional parameter corresponds to the first judgment result.

In an embodiment, said adjusting a first functional parameter of the electronic device according to the first judgment result comprises: adjusting the first functional parameter in a first adjustment mode when the first judgment result indicates that a movement direction in the movement parameters of the second operation which are represented by the first data information is a first preset direction or a third preset direction relative to the electronic device, wherein the electronic device is in a posture corresponding to the first posture information.

In an embodiment, if the first judgment result indicates that the movement direction in the movement parameters of the second operation which are represented by the first data information is a first direction or a third direction and the electronic device is correspondingly in a first posture or a second posture corresponding to the first posture information, the first direction or the third direction relative to the electronic device in the first posture or the second posture is correspondingly determined as the first preset direction or the third preset direction.

In an embodiment, said adjusting a first functional parameter of the electronic device according to the first judgment result comprises: adjusting the first functional parameter in a second adjustment mode when the first judgment result indicates that a movement direction in the movement parameters of the second operation which are represented by the first data information is a second preset direction or a fourth preset direction relative to the electronic device, wherein the electronic device is in a posture corresponding to the first posture information.

In an embodiment, if the first judgment result indicates that the movement direction in the movement parameters of the second operation which are represented by the first data information is a second direction or a fourth direction and the electronic device is correspondingly in a first posture or a second posture corresponding to the first posture information, the second direction or the fourth direction relative to the electronic device in the first posture or the second posture is correspondingly determined as the second preset direction or the fourth preset direction.

In an embodiment, the method further comprises: determining, according to the first data information, a first displacement formed by the second operation on the first key, and a first speed of the second operation relative to the first key; judging whether the first displacement and the first speed satisfy a first preset rule to acquire a first judgment result; and adjusting the first functional parameter in the second adjustment mode according to the first judgment result.

In an embodiment, adjusting the first functional parameter in the second adjustment mode according to the first judgment result comprises: adjusting, according to the first judgment result, the first functional parameter to a first value in the second adjustment mode within a preset period of time when the first judgment result indicates that the first displacement and the first speed satisfy the first preset rule.

In an embodiment, the method further comprises: determining, according to the first data information, a second displacement formed by the second operation on the first key; and determining a first adjustment amplitude corresponding to the second displacement; adjusting the first functional parameter in the first adjustment mode comprises adjusting the first functional parameter with the first adjustment amplitude in the first adjustment mode.

According to another aspect of the present disclosure, an electronic device is provided. The electronic device comprises: a first key arranged at a first position of the electronic device, the first key being operable to sense a touch operation; and a second key arranged at a second position of the electronic device, the second key being operable to adjust a first functional parameter of the electronic device, wherein only the first key and the second key are arranged on a surface of the body of the electronic device.

In an embodiment, a first touch sensing region is arranged in the first key, and the electronic device is operable to respond to the touch operation via the first touch sensing region.

In an embodiment, the first key is arranged at a first position on a first surface of the electronic device, the first surface being a surface where the display area of the electronic device is located, the first position being a position corresponding to at least a part of the first surface excluding the display area, and the first key being concave relative to the first surface.

In an embodiment, a physiological feature collection unit is integrated in the first key, and the electronic device is operable to collect physiological feature parameters of an operating body corresponding to the touch operation through the physiological feature collection unit.

According to yet another aspect of the present disclosure, an electronic device is provided. The electronic device comprises: a first key arranged at a first position of the electronic device, the first key is operable to respond to a first operation to control the electronic device to generate a first executable instruction based on the first operation for instructing the electronic device to display a first main interface through the first executable instruction; and a processor configured to: receive a second operation via the first key when the electronic device displays a first interface of a first application program; judge whether the second operation satisfies a first preset rule to acquire a first judgment result; generate, according to the first judgment result, a second executable instruction based on the second operation; and control, according to the second executable instruction, the electronic device to perform an operation corresponding to the second executable instruction.

DETAILED DESCRIPTION

For more thoroughly understanding the features and technical content of the present disclosure, the implementation of the present disclosure will be described in detail below in conjunction with accompanying drawings. The accompanying drawings are merely used for reference and illustration, without limiting the present disclosure.

First Embodiment

Figure 1:
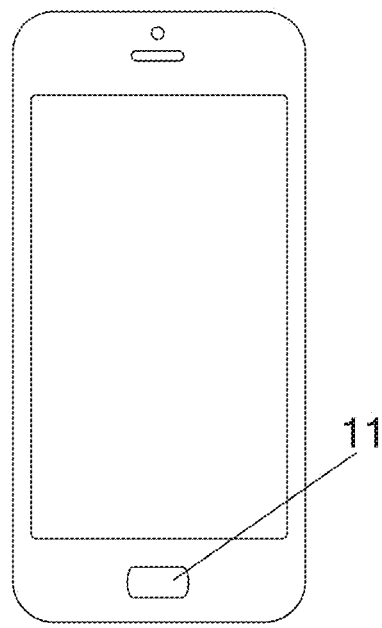
FIG. 1 is a first structural diagram of an electronic device according to an embodiment of the present disclosure.

FIG. 1 is a first structural diagram of an electronic device according to an embodiment of the present disclosure. As shown in FIG. 1, the electronic device comprises a first key 11 arranged in a first position of the electronic device. The first key 11 is a operable to sense a touch operation, and only the physical key is arranged on a surface of the body of the electronic device.

The electronic device according to the present embodiment may specifically be an intelligent electronic device such as a mobile phone, a tablet computer or the like.

In the present embodiment, as only a physical key, i.e., a first key, is arranged in the whole body of the electronic device, the first key may integrate functions of all physical keys and/or virtual keys in the existing electronic device. For example, the first key may have a home function, a back function, a function of switching on/off the electronic device, a volume adjustment function or the like. Thus, a user of the electronic device can achieve different application functions only by performing different touch operations or the same touch operation on the first key. Therefore, the electronic device according to the present embodiment can ensure that all operations are uniformly performed on the first key as much as possible, thereby improving the user experience.

In a specific embodiment, the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a contact operation relative to the first key, as an example, the first touch operation is an operation of single clicking on the first key), the electronic device generates a first instruction in response to the first touch operation, so that the electronic device returns back to the first main interface based on the instruction. At this time, an application program corresponding to the first application is suspended by the electronic device.

Further, when the first touch operation is an operation of double clicking on the first key, the electronic device generates a first instruction in response to the first touch operation of double clicking on the first key, so that the electronic device displays a second display interface in the display area based on the first instruction. The second display interface is an interface corresponding to a current background running program of the electronic device.

In another specific embodiment, the first key has a home function and a back function. That is, the electronic device not only has the home function described in the specific embodiment above, but also has a back function described below. In an example, when a first display interface (the first display interface is a display interface or an operation interface corresponding to the first application) is displayed in a display area of the electronic device, the electronic device receives a first touch operation via the first key (for example, the first touch operation is a contact operation relative to the first key). When the first touch operation satisfies a preset rule, the electronic device generates a first instruction in response to the first touch operation, so that the electronic device exits the first application or returns to an upper-level display interface corresponding to the first display interface based on the first instruction.

It should be noted that the above specific embodiment is merely used to explain the present disclosure instead of limiting the present disclosure. In practical applications, there is only one physical key in the whole body of the electronic device. The physical key may be configured as a key having any functions according to practical conditions.

In the electronic device according to the embodiment of the present disclosure, as only one physical key, i.e., the first key, is arranged in the whole body of the electronic device, when the electronic device is manufactured, it only needs to punch the electronic device once in a place where the first key is arranged. Therefore, compared with the existing electronic device having many physical keys, the whole structure of the electronic device according to the present embodiment has a high intensity, and the risk in a fault occurring in the body of the electronic device is low, which can be the basis for improving the comfort degree of user's operation on the electronic device, thereby improving the user experience.

In addition, as there is only one key, i.e., the first key, arranged in the whole body of the electronic device, the body of the electronic device according to the present disclosure has an elegant appearance, which further satisfies the user's requirements for the elegant appearance of the electronic device.

Second Embodiment

Figure 2:
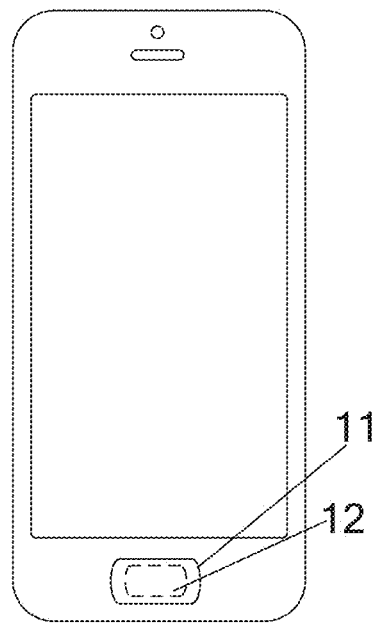
FIG. 2 is a second structural diagram of an electronic device according to an embodiment of the present disclosure.

FIG. 2 is a second structural diagram of an electronic device according to another embodiment of the present disclosure. As shown in FIG. 2, a first key 11 arranged in a first position of the electronic device. The first key 11 is operable to sense a touch operation, and only the physical key is arranged on a surface of the body of the electronic device. Further, a first touch sensing region 12 is arranged in the first key 11, and the electronic device can respond to the touch operation via the first touch sensing region 12.

The electronic device according to the present embodiment may also specifically be an intelligent electronic device such as a mobile phone, a tablet computer or the like.

In the present embodiment, as only a physical key, i.e., a first key, is arranged in the whole body of the electronic device, the first key may integrate functions of all physical keys and/or virtual keys in the existing electronic device. For example, the first key may have a home function, a back function, a function of switching on/off the electronic device, a volume adjustment function or the like. Thus, a user of the electronic device can achieve different application functions only by performing different touch operations or the same touch operation on the first key. Therefore, the electronic device according to the present embodiment can ensure that all operations are uniformly performed on the first key as much as possible, thereby improving the user experience.

In a specific embodiment, the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a press operation relative to the first key), and a first key distance is formed by the press operation on the first key in a first direction, that is, the first touch operation is an operation of single clicking on the first key, the electronic device generates a first instruction in response to the first touch operation, so that the electronic device returns back to the first main interface based on the instruction. At this time, an application program corresponding to the first application is suspended by the electronic device.

Further, when the first touch operation is an operation of continuously double pressing on the first key, the first key distance is formed by each press operation on the first key in the first direction and an interval between two press operations satisfies a preset condition (that is, the first touch operation is an operation of double clicking on the first key), the electronic device generates a first instruction in response to the first touch operation of double clicking on the first key, so that the electronic device displays a second display interface in the display area based on the first instruction. The second display interface is an interface corresponding to a current background running program of the electronic device.

Here, as the first touch sensing region is arranged in the first key, the electronic device according to the present embodiment may further achieve the back function via the first touch sensing region in the first key. Specifically, when the first display interface (which is a display interface or an operation interface corresponding to a first application) is displayed in the display area of the electronic device, the electronic device receives a second touch operation (for example, the second touch operation is a contact operation in the first touch sensing region, which will not result in a first key distance being formed on the first key in the first direction) via the first touch sensing region in the first key. Further, when the second touch operation satisfies a preset rule, the electronic device generates a second instruction in response to the second touch operation, so that the electronic device exits the first application or returns to an upper-level display interface corresponding to the first display interface based on the second instruction.

In another specific embodiment, the first key has both a home function and a back function. That is, the electronic device can not only achieve the home function through an operation of pressing on the first key, but also can achieve the back function through an operation of touching the first touch sensing region in the first key. Thus, the first key in the electronic device according to the present embodiment has both the home function and the back function, which can improve the comfort degree of user's operation on the electronic device, and achieve indistinctive operating experience, thereby satisfying the user's requirements and improving the user experience.

It should be noted that the above specific embodiment is merely used to explain the present disclosure instead of limiting the present disclosure. In practical applications, there is only one physical key in the whole body of the electronic device. The physical key may be configured as a key having any functions according to practical conditions.

In the electronic device according to the embodiment of the present disclosure, as only one physical key, i.e., the first key, is arranged in the whole body of the electronic device, when the electronic device is manufactured, it only needs to punch the electronic device once in a place where the first key is arranged. Therefore, compared with the existing electronic device having many physical keys, the whole structure of the electronic device according to the present embodiment has a high intensity, and the risk in a fault occurring in the body of the electronic device is low, which can be the basis for improving the comfort degree of user's operation on the electronic device, thereby improving the user experience.

In addition, as there is only one key, i.e., the first key, arranged in the whole body of the electronic device, the body of the electronic device according to the present disclosure has an elegant appearance, which further satisfies the user's requirements for the elegant appearance of the electronic device.

Third Embodiment

Figure 3:
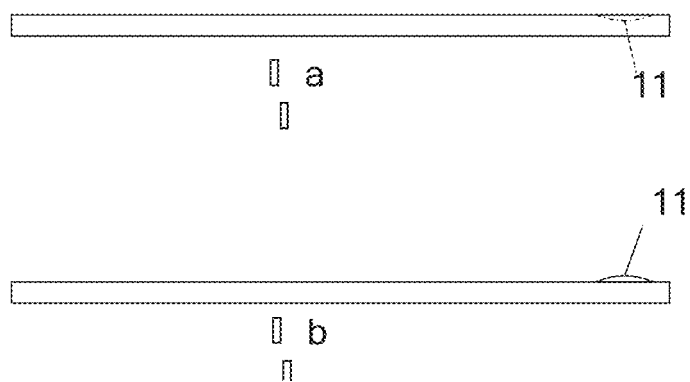
FIG. 3 is a side view of an electronic device according to an embodiment of the present disclosure.

FIG. 3 is a first side view of an electronic device according to another embodiment of the present disclosure, wherein FIG. 3(a) is a side view of a first key being concave relative to a first surface in the electronic device, and FIG. 3(b) is a side view of the first key being convex relative to the first surface in the electronic device. As shown in FIG. 3, the electronic device comprises a first key 11 arranged in a first position of the electronic device. The first key 11 is operable to sense a touch operation, and only the physical key is arranged on a surface of the body of the electronic device.

The electronic device comprises a display unit. Correspondingly, the first key is arranged in a first position in the first surface of the electronic device. The first surface is a surface where the display unit is located, the first position is a position corresponding to at least a part of the first surface excluding a display area of the display unit, and the first key is concave or convex relative to the first surface where the display unit is located.

The electronic device according to the present embodiment may also specifically be an intelligent electronic device such as a mobile phone, a tablet computer or the like.

In a specific embodiment, for convenience of operating the first key of the electronic device by a user of the electronic device (for example, for convenience of pressing on or touching the first key, even if the electronic device is hold by the user of the electronic device in hand), in the present embodiment, the first key is arranged in a first position corresponding to at least a part of the first surface of the electronic device excluding the display area of the display unit. For example, as shown in FIG. 1 or 2, the first key is arranged in the middle of the first surface below the display area of the display unit. Thus, the user's requirements for elegant appearance are satisfied, while the user's operating habits are also met.

In another specific embodiment, for convenience of operating the first key by the user of the electronic device, the first key is concave or convex relative to the first surface where the display unit is located. Thus, when the user wants to operate the first key, the user can accurately view the first key in time, thereby improving the user experience. Further, in order to avoid a problem that the first key is mis-operated by the user of the electronic device, the first key is concave relative to the first surface where the display unit is located. Thus, the problem of mis-operation can be effectively avoided in the premise that the requirements for elegant appearance are satisfied and the operating habits are met, thereby improving the user experience.

In the present embodiment, as only a physical key, i.e., a first key, is arranged in the whole body of the electronic device, the first key may integrate functions of all physical keys and/or virtual keys in the existing electronic device. For example, the first key may have a home function, a back function, a function of switching on/off the electronic device, a volume adjustment function or the like. Thus, a user of the electronic device can achieve different application functions only by performing different touch operations or the same touch operation on the first key. Therefore, the electronic device according to the present embodiment can ensure that all operations are uniformly performed on the first key as much as possible, thereby improving the user experience.

In a specific embodiment, the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a press operation relative to the first key), and a first key distance is formed by the press operation on the first key in a first direction, that is, the first touch operation is an operation of single clicking on the first key, the electronic device generates a first instruction in response to the first touch operation, so that the electronic device returns back to the first main interface based on the instruction. At this time, an application program corresponding to the first application is suspended by the electronic device.

Further, when the first touch operation is an operation of continuously double pressing on the first key, the first key distance is formed by each press operation on the first key in the first direction and an interval between two press operations satisfies a preset condition (that is, the first touch operation is an operation of double clicking on the first key), the electronic device generates a first instruction in response to the first touch operation of double clicking on the first key, so that the electronic device displays a second display interface in the display area based on the first instruction. The second display interface is an interface corresponding to a current background running program of the electronic device.

Here, as the first touch sensing region is arranged in the first key, the electronic device according to the present embodiment may further achieve the back function via the first touch sensing region in the first key. Specifically, when the first display interface (which is a display interface or an operation interface corresponding to a first application) is displayed in the display area of the electronic device, the electronic device receives a second touch operation (for example, the second touch operation is a contact operation in the first touch sensing region, which will not result in a first key distance being formed on the first key in the first direction) via the first touch sensing region in the first key. Further, when the second touch operation satisfies a preset rule, the electronic device generates a second instruction in response to the second touch operation, so that the electronic device exits the first application or returns to an upper-level display interface corresponding to the first display interface based on the second instruction.

In another specific embodiment, the first key has both a home function and a back function. That is, the electronic device can not only achieve the home function through an operation of pressing on the first key, but also can achieve the back function through an operation of touching the first touch sensing region in the first key. Thus, the first key in the electronic device according to the present embodiment has both the home function and the back function, which can improve the comfort degree of user's operation on the electronic device, and achieve indistinctive operating experience, thereby satisfying the user's requirements and improving the user experience.

It should be noted that the above specific embodiment is merely used to explain the present disclosure instead of limiting the present disclosure. In practical applications, there is only one physical key in the whole body of the electronic device. The physical key may be configured as a key having any functions according to practical conditions.

In the electronic device according to the embodiment of the present disclosure, as only one physical key, i.e., the first key, is arranged in the whole body of the electronic device, when the electronic device is manufactured, it only needs to punch the electronic device once in a place where the first key is arranged. Therefore, compared with the existing electronic device having many physical keys, the whole structure of the electronic device according to the present embodiment has a high intensity, and the risk in a fault occurring in the body of the electronic device is low, which can be the basis for improving the comfort degree of user's operation on the electronic device, thereby improving the user experience.

In addition, as there is only one key, i.e., the first key, arranged in the whole body of the electronic device, the body of the electronic device according to the present disclosure has an elegant appearance, which further satisfies the user's requirements for the elegant appearance of the electronic device.

Fourth Embodiment

Figure 4:
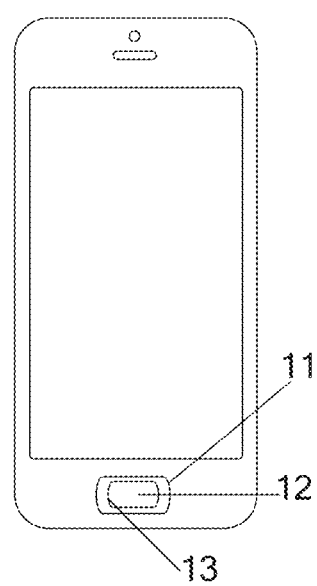
FIG. 4 is a third structural diagram of an electronic device according to an embodiment of the present disclosure.

FIG. 4 is a third structural diagram of an electronic device according to another embodiment of the present disclosure. The electronic device is based on the electronic device according to the third embodiment. As shown in FIG. 4, when the first key is concave relative to the first surface where the display unit is located, the first key is arranged with a first frame 13. The first frame 13 can at least have a first touch sensing region 12 of the first key 11 arranged therein.

Thus, when a user of the electronic device wants to press on or touch the first key, it is convenient for the user of the electronic device to accurately view the first key in time due to the first frame arranged in the first key, thereby improving the user experience.

For the electronic device according to the present embodiment, on one hand, when the user of the electronic device presses on the first key, a first key distance is formed on the first key in a first direction. Thus, the electronic device can provide a better tactile sensation to the user of the electronic device during a press operation, thereby improving the touch user experience. On the other hand, when the user of the electronic device touches the first touch sensing region in the first frame of the first key, the first key distance will not be formed on the first key in the first direction. Therefore, in the present embodiment, different operations (for example, a press operation and a touch operation or the like) can be uniformly performed on one physical key having a touch sensing region. In this way, when operations are performed frequently, even different functions can be performed via the first physical key, which achieves indistinctive operating experience, thereby improving the user experience.

Fifth Embodiment

An electronic device is provided according to another embodiment of the present disclosure, as shown in FIG. 1 or 2. The electronic device comprises a first key 11 arranged in a first position of the electronic device. The first key 11 is operable to sense a touch operation, and only the physical key is arranged on a surface of the body of the electronic device.

Figure 5:
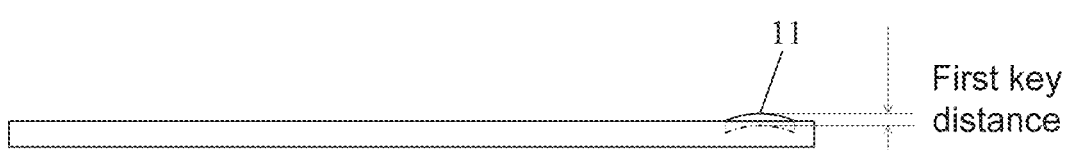
FIG. 5 is a side view of a first key distance formed on an electronic device according to an embodiment of the present disclosure.

Further, when the first key responds to the touch operation, a first key distance is formed on the first key in a first direction. FIG. 5 illustrates the first key distance formed on the first key in the first direction when the first key is convex relative to the first surface.

The electronic device according to the present embodiment may also specifically be an intelligent electronic device such as a mobile phone, a tablet computer or the like.

In a specific embodiment, as the first key is a physical key, in order to improve the comfort degree of user's operation on the physical key, a first key distance is formed in a first direction when the first key responds to the touch operation. Specifically, as shown in FIGS. 1, 2 and 5, when the first key is arranged in the middle of the first surface below the display area of the electronic device, the first direction is perpendicular to the first surface and extends towards the interior of the first surface. Here, the first surface is a surface where the display area of the electronic device is located.

In the present embodiment, as only a physical key, i.e., a first key, is arranged in the whole body of the electronic device, the first key may integrate functions of all physical keys and/or virtual keys in the existing electronic device. For example, the first key may have a home function, a back function, a function of switching on/off the electronic device, a volume adjustment function or the like. Thus, a user of the electronic device can achieve different application functions only by performing different touch operations or the same touch operation on the first key. Therefore, the electronic device according to the present embodiment can ensure that all operations are uniformly performed on the first key as much as possible, thereby improving the user experience.

In a specific embodiment, the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a press operation relative to the first key), and a first key distance is formed by the press operation on the first key in a first direction, that is, the first touch operation is an operation of single clicking on the first key, the electronic device generates a first instruction in response to the first touch operation, so that the electronic device returns back to the first main interface based on the instruction. At this time, an application program corresponding to the first application is suspended by the electronic device.

Further, when the first touch operation is an operation of continuously double pressing on the first key, the first key distance is formed by each press operation on the first key in the first direction and an interval between two press operations satisfies a preset condition (that is, the first touch operation is an operation of double clicking on the first key), the electronic device generates a first instruction in response to the first touch operation of double clicking on the first key, so that the electronic device displays a second display interface in the display area based on the first instruction.

The second display interface is an interface corresponding to a current background running program of the electronic device.

In another specific embodiment, as the first key is operable to sense a touch operation, a touch sensing region is arranged in the first key. Further, the first key can respond to a contact operation of an operating body in the touch sensing region of the first key. Therefore, the electronic device according to the present embodiment may further achieve the back function via the first touch sensing region in the first key. Specifically, when the first display interface (which is a display interface or an operation interface corresponding to a first application) is displayed in the display area of the electronic device, the electronic device receives a second touch operation (for example, the second touch operation is a contact operation in the touch sensing region in the first key, which will not result in a first key distance being formed on the first key in the first direction) via the touch sensing region in the first key. Further, when the second touch operation satisfies a preset rule, the electronic device generates a second instruction in response to the second touch operation, so that the electronic device exits the first application or returns to an upper-level display interface corresponding to the first display interface based on the second instruction.

In another specific embodiment, the first key has both a home function and a back function. That is, the electronic device can not only achieve the home function through an operation of pressing on the first key, but also can achieve the back function through an operation of touching the touch sensing region in the first key. Thus, the first key in the electronic device according to the present embodiment has both the home function and the back function, which can improve the comfort degree of user's operation on the electronic device, and achieve indistinctive operating experience, thereby satisfying the user's requirements and improving the user experience.

It should be noted that the above specific embodiment is merely used to explain the present disclosure instead of limiting the present disclosure. In practical applications, there is only one physical key in the whole body of the electronic device. The physical key may be configured as a key having any functions according to practical conditions.

In the electronic device according to the embodiment of the present disclosure, as only one physical key, i.e., the first key, is arranged in the whole body of the electronic device, when the electronic device is manufactured, it only needs to punch the electronic device once in a place where the first key is arranged. Therefore, compared with the existing electronic device having many physical keys, the whole structure of the electronic device according to the present embodiment has a high intensity, and the risk in a fault occurring in the body of the electronic device is low, which can be the basis for improving the comfort degree of user's operation on the electronic device, thereby improving the user experience.

In addition, as there is only one key, i.e., the first key, arranged in the whole body of the electronic device, the body of the electronic device according to the present disclosure has an elegant appearance, which further satisfies the user's requirements for the elegant appearance of the electronic device.

Sixth Embodiment

The electronic device according to the present embodiment is based on the electronic device according to the first embodiment, and a physiological feature collection unit is integrated in the first key. The electronic device can collect physiological feature parameters of an operating body corresponding to a touch operation through the physiological feature collection unit.

Further, the physiological feature parameters may represent physical conditions of the operating body corresponding to the touch operation. For example, the physiological feature parameters may be information about iron ion content and information about hemoglobin content in the blood of the operating body corresponding to the touch operation. Thus, with the electronic device according to the present embodiment, the physiological feature parameters of the operating body corresponding to the touch operation can be determined, which is the basis for determining the physical conditions of the operating body.

In a specific embodiment, a fingerprint recognition ring with a first material may be arranged in the first key, to perform the function of the physiological feature collection unit. For example, the fingerprint recognition ring with a first material is used to perform functions such as fingerprint collection, fingerprint recognition or the like.

In another specific embodiment, a sensor sub-unit may be integrated in the physiological feature collection unit. In this way, when the operating body touches the first key, the sensor sub-unit can detect an amount of variation in a capacitance corresponding to the operating body. Thereby, the physiological feature parameters of the operating body are determined based on the amount of variation in the capacitance.

The electronic device according to the embodiment of the present disclosure is simple and easy to realize, which can achieve a variety of applications of the electronic device. Therefore, the electronic device according to the present embodiment can be the basis for improving user experience.

Seventh Embodiment

Figure 6:
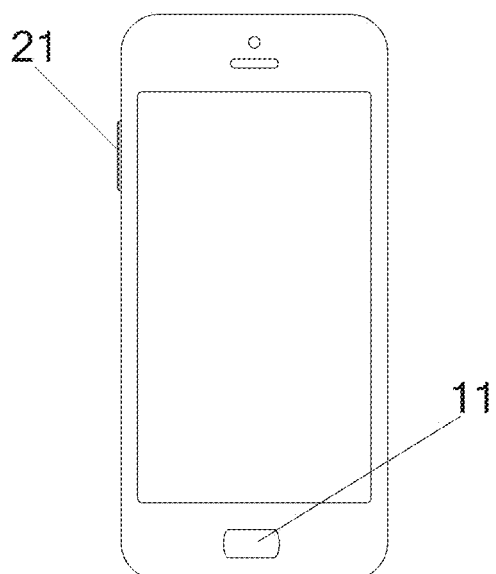
FIG. 6 is a fourth structural diagram of an electronic device according to an embodiment of the present disclosure.

FIG. 6 is a fourth structural diagram of an electronic device according to another embodiment of the present disclosure. As shown in FIG. 6, the electronic device comprises a first key 11 and a second key 21. The first key 11 is arranged in a first position of the electronic device, and the first key 11 is operable to sense a touch operation. The second key 21 is arranged in a second position of the electronic device, and the second key 21 is operable to adjust a first functional parameter of the electronic device. Only the first key 11 and the second key 21 are arranged on a surface of the body of the electronic device.

The electronic device according to the present embodiment may also specifically be an intelligent electronic device such as a mobile phone, a tablet computer or the like.

In the present embodiment, when the second key can only adjust the first functional parameter of the electronic device (for example, the second key can only adjust the functional parameters corresponding to the volume of the electronic device), as only two physical keys, i.e., a first key and a second key, are arranged in the whole body of the electronic device, the first key may integrate functions of all physical keys and/or virtual keys in the existing electronic device excluding the functions corresponding to the second key. For example, the first key may have a home function, a back function, a function of switching on/off the electronic device or the like. Thus, a user of the electronic device can achieve control of the volume of the electronic device via the second key while achieving different application functions by performing different touch operations or the same touch operation on the first key. Therefore, the electronic device according to the present embodiment can ensure that all operations are uniformly performed on the first key as much as possible, thereby improving the user experience.

In a specific embodiment, the second key is a physical key which controls the functional parameters corresponding to the volume of the electronic device, while the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a contact operation relative to the first key, and specifically, the first touch operation is an operation of single clicking on the first key), the electronic device generates a first instruction in response to the first touch operation, so that the electronic device returns back to the first main interface based on the instruction. At this time, an application program corresponding to the first application is suspended by the electronic device.

Further, when the first touch operation is an operation of double clicking on the first key, the electronic device generates a first instruction in response to the first touch operation of double clicking on the first key, so that the electronic device displays a second display interface in the display area based on the first instruction. The second display interface is an interface corresponding to a current background running program of the electronic device.

In another specific embodiment, the second key is a physical key which controls the functional parameters corresponding to the volume of the electronic device. The first key has both a home function and a back function. That is, the electronic device not only has the home function as described in the above specific embodiment, but also has a back function described below. Specifically, when the first display interface (which is a display interface or an operation interface corresponding to a first application) is displayed in the display area of the electronic device, the electronic device receives a first touch operation (for example, the first touch operation is a contact operation relative to the first key) via the first key and the first touch operation satisfies a preset rule, the electronic device generates a first instruction in response to the first touch operation, so that the electronic device exits the first application or returns to an upper-level display interface corresponding to the first display interface based on the first instruction.

It should be noted that the above specific embodiment is merely used to explain the present disclosure instead of limiting the present disclosure. In practical applications, there are only two physical keys in the whole body of the electronic device. The physical keys may be configured as keys having any functions according to practical conditions.

It should be noted that the electronic device according to the present embodiment differs from the electronic device according to any of the first embodiment to the sixth embodiment in that a physical key, i.e., the second key, is additionally added in the present embodiment. That is, there are only two physical keys on the surface of the body of the electronic device according to the present embodiment, which are the first key and the second key respectively. Further, the functions of the first key described in the present embodiment may be the same as or different from the functions of the first key described in any of the first embodiment to the sixth embodiment. Here, the same functions of the first key as those of the first key described in any of the first embodiment to the sixth embodiment will not be described in detail in the present embodiment.

For the electronic device according to the embodiment of the present disclosure, as only two physical keys, i.e., the first key and the second key, are arranged in the whole body of the electronic device, when the electronic device is manufactured, it only needs to punch the electronic device twice in places where the first key and the second key are arranged. Therefore, compared with the existing electronic device having many physical keys, the whole structure of the electronic device according to the present embodiment has a high intensity, and the risk in a fault occurring in the body of the electronic device is low, which can be the basis for improving the comfort degree of user's operation on the electronic device, thereby improving the user experience.

In addition, as there are only two keys, i.e., the first key and the second key, arranged in the whole body of the electronic device, the body of the electronic device according to the present disclosure has an elegant appearance, which further satisfies the user's requirements for the elegant appearance of the electronic device.

Eighth Embodiment

The electronic device according to the present embodiment is based on the electronic device according to the seventh embodiment. A first touch sensing region is arranged in the first key, and the electronic device can respond to the touch operation via the first touch sensing region.

In a specific embodiment, the second key is a physical key which controls the functional parameters corresponding to the volume of the electronic device, while the first key is a home key, i.e., the first key has a home function. In an example, a first display interface is displayed in a display area of the electronic device, and the first display interface is not a first main interface (for example, the first display interface is a display interface or an operation interface corresponding to a first application). In this case, if the electronic device receives a first touch operation via the first key (for example, the first touch operation is a press operation relative to the first key and a first key distance is formed by the press operation on the first key in a first direction, that is, the first touch operation is an operation of single clicking on the first key), the electronic device generates a first instruction in response to the first touch operation, so that the electronic device returns back to the first main interface based on the instruction. At this time, an application program corresponding to the first application is suspended by the electronic device.

Further, when the first touch operation is an operation of continuously double pressing on the first key, the first key distance is formed by each press operation on the first key in the first direction and an interval between two press operations satisfies a preset condition (that is, the first touch operation is an operation of double clicking on the first key), the electronic device generates a first instruction in response to the first touch operation of double clicking on the first key, so that the electronic device displays a second display interface in the display area based on the first instruction. The second display interface is an interface corresponding to a current background running program of the electronic device.

Here, as the first touch sensing region is arranged in the first key, the electronic device according to the present embodiment may further achieve the back function via the first touch sensing region in the first key. Specifically, when the first display interface (which is a display interface or an operation interface corresponding to a first application) is displayed in the display area of the electronic device, the electronic device receives a second touch operation (for example, the second touch operation is a contact operation in the first touch sensing region, which will not result in a first key distance being formed on the first key in the first direction) via the first touch sensing region in the first key. Further, when the second touch operation satisfies a preset rule, the electronic device generates a second instruction in response to the second touch operation, so that the electronic device exits the first application or returns to an upper-level display interface corresponding to the first display interface based on the second instruction.

In another specific embodiment, the second key is a physical key which controls the functional parameters corresponding to the volume of the electronic device, and the first key has both a home function and a back function. That is, the electronic device can not only achieve the home function through an operation of pressing on the first key, but also can achieve the back function through an operation of touching the first touch sensing region in the first key. Thus, the first key in the electronic device according to the present embodiment has both the home function and the back function, which can improve the comfort degree of user's operation on the electronic device, and achieve indistinctive operating experience, thereby satisfying the user's requirements and improving the user experience.

Ninth Embodiment

The electronic device according to the present embodiment is based on the electronic device according to the seventh embodiment, and the first key is arranged in a first position in the first surface of the electronic device. The first surface is a surface where the display area of the electronic device is located, the first position is a position corresponding to at least a part of the first surface excluding the display area, and the first key is concave or convex relative to the first surface.

In some embodiments, the first key is concave relative to the first surface.

In some embodiments, a second key is arranged in a second position in a second surface of the electronic device. The second surface is perpendicular to the first surface.

In some specific embodiments, for convenience of operating the first key of the electronic device by a user of the electronic device (for example, for convenience of pressing on or touching the first key, even if the electronic device is hold by the user of the electronic device in hand), in the present embodiment, the first key is arranged in a first position corresponding to at least a part of the first surface of the electronic device excluding the display area of the display unit. For example, as shown in FIG. 6, the first key is arranged in the middle of the first surface below the display area of the display unit. Thus, the user's requirements for elegant appearance are satisfied, while the user's operating habits are also met.

In another specific embodiment, for convenience of operating the first key by the user of the electronic device, the first key is concave or convex relative to the first surface where the display unit is located. Thus, when the user wants to operate the first key, the user can accurately view the first key in time, thereby improving the user experience. Further, in order to avoid a problem that the first key is mis-operated by the user of the electronic device, the first key is concave relative to the first surface where the display unit is located. Thus, the problem of mis-operation can be effectively avoided in the premise that the requirements for elegant appearance are satisfied and the operating habits are met, thereby improving the user experience.

In another specific embodiment, a first touch sensing region is arranged in the first key, and the electronic device can respond to the touch operation via the first touch sensing region. Further, when the first key is concave relative to the first surface where the display unit is located, the first key is arranged with a first frame. The first frame can at least have the first touch sensing region of the first key arranged therein. Thus, when the user of the electronic device wants to press on or touch the first key, as the first frame is arranged in the first key, it is convenient for the user to accurately view the first key in time, thereby improving the user experience.

For the electronic device according to the present embodiment, on one hand, when the user of the electronic device presses on the first key, a first key distance is formed on the first key in a first direction. Thus, the electronic device can provide a better tactile sensation to the user of the electronic device during a press operation, thereby improving the touch user experience. On the other hand, when the user of the electronic device touches the first touch sensing region in the first frame of the first key, the first key distance will not be formed on the first key in the first direction. Therefore, in the present embodiment, different operations (for example, a press operation and a touch operation or the like) can be uniformly performed on one physical key having a touch sensing region. In this way, when operations are performed frequently, even different functions can be performed via the first physical key, which achieves indistinctive operating experience, thereby improving the user experience.

In another specific embodiment, a physiological feature collection unit is integrated in the first key. The electronic device can collect physiological feature parameters of an operating body corresponding to a touch operation through the physiological feature collection unit.

Further, the physiological feature parameters may represent physical conditions of the operating body corresponding to the touch operation. For example, the physiological feature parameters may be information about iron ion content and/or information about hemoglobin content in the blood of the operating body corresponding to the touch operation. Thus, with the electronic device according to the present embodiment, the physiological feature parameters of the operating body corresponding to the touch operation can be determined, which is the basis for determining the physical conditions of the operating body.

In another specific embodiment, a fingerprint recognition ring with a first material may be arranged in the first key, to perform the function of the physiological feature collection unit. For example, the fingerprint recognition ring with a first material is used to perform functions such as fingerprint collection, fingerprint recognition or the like.

In another specific embodiment, a sensor sub-unit may be integrated in the physiological feature collection unit. In this way, when the operating body touches the first key, the sensor sub-unit can detect an amount of variation in a capacitance corresponding to the operating body. Thereby, the physiological feature parameters of the operating body are determined based on the amount of variation in the capacitance.

The electronic device according to the embodiment of the present disclosure is simple and easy to realize, which can achieve a variety of applications of the electronic device. Therefore, the electronic device according to the present embodiment can be the basis for improving user experience. Here, it should be noted that the diagram of the electronic device according to the embodiment of the present disclosure is merely used to explain the present disclosure, instead of limiting the present disclosure.

Tenth Embodiment

Figure 7:
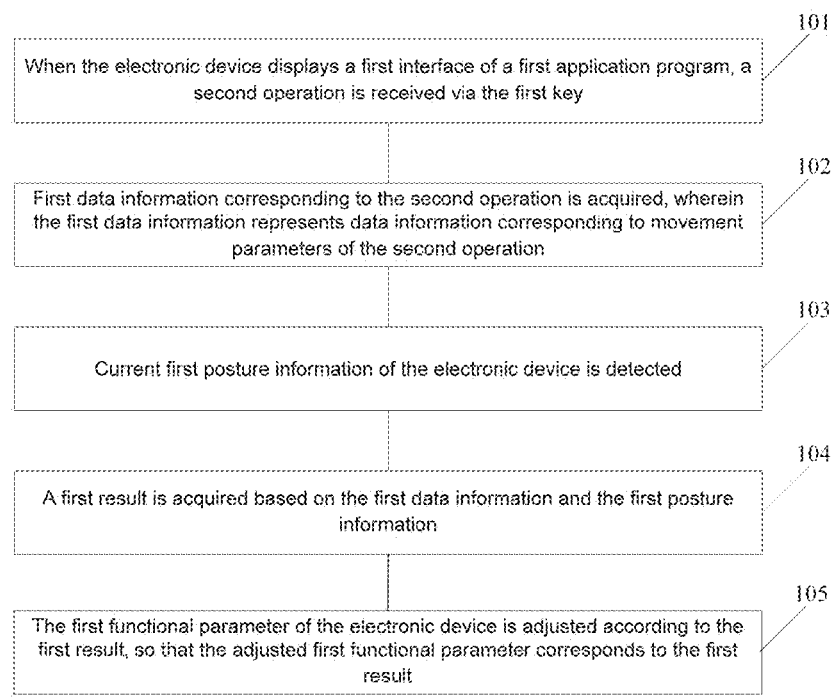
FIG. 7 is a first flowchart of implementing a touch method according to an embodiment of the present disclosure.

FIG. 7 is a first flowchart of implementing a touch method according to an embodiment of the present disclosure. The method is applied in an electronic device. The electronic device comprises a first key arranged in a first position of the electronic device, and can enable, in response to a first operation, the electronic device to generate a first executable instruction based on the first operation. The first key is a physical key or a virtual key which can enable the electronic device to perform the first executable instruction based on the first operation.

As shown in FIG. 7, the method comprises step 101. In step 101, when the electronic device displays a first interface of a first application program, a second operation is received via the first key.

In the present embodiment, the electronic device may specifically be an intelligent electronic device such as a mobile phone, a tablet computer or the like.

In the present embodiment, no matter whether the first key is a physical key or a virtual key, the first key is operable to sense a touch operation. In this case, when the first operation is a single-click operation or a touch operation relative to the first key, the first key enables, in response to the first operation, the electronic device to generate a first executable instruction based on the first operation. For example, the electronic device is instructed according to the first executable instruction to display a first main interface in a display area thereof. That is, the first key may specifically be a home key, i.e., the first key has a home function. Alternatively, the electronic device is controlled according to the first executable instruction to exit the first interface or a first application program corresponding to the first interface, so that the electronic device returns to an upper-level interface corresponding to the current first interface. That is, the first key may specifically be a back key, i.e., the first key has a back function. Alternatively, the first key has both a home function and a back function.

In the present embodiment, a first touch sensing region is arranged in the first key. Thus, the first key can receive the second operation, i.e., a sliding operation, via the first touch sensing region, so as to adjust a first functional parameter of the electronic device in response to the second operation.

In the present embodiment, the first interface may be a display interface corresponding to the first application program. The first application program is a first type of application programs randomly installed in the electronic device which can be supported by the electronic device, for example, an application program corresponding to video play software. Correspondingly, the first interface displays corresponding display content in the video content.

In the present embodiment, a sensor unit may be arranged in the electronic device. Further, current posture information of the electronic device may be detected via the sensor unit. Thereby, a display direction of the display content in the display area of the electronic device is adjusted based on the posture information, so that the display direction corresponds to a gravity direction. Thus, even if the electronic device is in different postures, the user of the electronic device can view display content is a forward direction, to satisfy different user's requirements, thereby improving user experience. Further, the gravity sensing process may be achieved by the sensor unit via an integrated gravity sensor, an integrated gyroscope or the like.

In step 102, first data information corresponding to the second operation is acquired. The first data information represents data information corresponding to movement parameters of the second operation.

In the present embodiment, the movement parameters include but are not limited to a direction, a displacement, a speed or the like. Specifically, the first data information may represent a movement direction and a movement speed formed by the second operation relative to the electronic device in a first touch sensing region of the first key and may represent a movement displacement formed by the second operation on the first key. Therefore, acquiring, by the electronic device, first data information corresponding to the second operation may further comprise acquiring, by the electronic device, a movement direction of the second operation relative to the electronic device; and/or acquiring a movement speed of the second operation relative to the electronic device; and/or acquiring a movement displacement formed by the second operation on the first key or the like.

In step 103, current first posture information of the electronic device is detected.

In the present embodiment, the electronic device detects the current first posture information of its own. For example, the electronic device detects the current first posture information of its own via the sensor unit arranged therein. Specifically, when a gravity sensor or a gyroscope is integrated in the sensor unit, the electronic device detects the first posture information of its own via the gravity sensor or the gyroscope.

In step 104, a first result is acquired based on the first data information and the first posture information.

In the present embodiment, after the electronic device acquires the first data information and the first posture information, a movement direction of the second operation relative to the electronic device which is represented in the first data information is analyzed to acquire a first result, so that the first functional parameter of the electronic device is adjusted based on the first result; and/or a movement displacement formed by the second operation on the first key which is represented in the first data information is analyzed to acquire a first result which includes an adjustment amplitude, so that the first functional parameter of the electronic device is adjusted based on the adjustment amplitude in the first result; and/or a movement speed of the second operation relative to the electronic device in the first data information is analyzed to acquire a first result which includes an adjustment speed, so that the first functional parameter of the electronic device is adjusted based on the adjustment speed in the first result.

It should be noted that only several feasible manners are described in the above analysis process of acquiring the first result, and the feasible manners described above are merely used to explain the embodiment of the present disclosure, instead of limiting the embodiment of the present disclosure. In practical applications, the analysis process of acquiring the first result may be randomly set according to technical support and practical conditions thereof.

In step 105, the first functional parameter of the electronic device is adjusted according to the first result, so that the adjusted first functional parameter corresponds to the first result.

In the present embodiment, the first functional parameter may specifically be a volume parameter of the electronic device. Specifically, when the first functional parameter is a volume parameter, the electronic device can determine a manner of adjusting the volume of the electronic device based on the posture information of its own and the received movement parameters corresponding to the second operation. Thus, the manner of adjusting the volume is not fixed, and can be correspondingly changed based on the relationship between the posture information of the electronic device and the movement parameters of the second operation. Therefore, even if the electronic device is in different postures, the touch user experience is kept consistent, thereby improving the user experience.

In the touch method according to the embodiment of the present disclosure, when the electronic device displays a first interface of a first application program, the second operation is received via the first key of the electronic device, and the movement parameters of the second operation relative to the electronic device are determined based on the second operation, so that the manner of adjusting the first functional parameter of the electronic device is determined based on a relationship between the movement parameters of the second operation relative to the electronic device and the detected current posture information of the electronic device. Thus, even if the first key is a physical key, the manner of adjusting the first functional parameter is not fixed. Therefore, the touch method according to the embodiment of the present disclosure can flexibly adjust the first functional parameter based on the posture information of the electronic device and the movement parameters of the second operation relative to the electronic device to satisfy the user's requirements, thereby improving the user experience.

In addition, as the first key may be a home key having a home function or a back key having a back function or a key having both a home function and a back function, after the first key incorporates the function of adjusting the first functional parameter, the key in the existing electronic device for adjusting the first functional parameter can be removed. That is, the key for adjusting the first functional parameter is incorporated with the existing home key, or the key for adjusting the first functional parameter is incorporated with the existing back key, or key for adjusting the first functional parameter is incorporated with the key having both a home function and a back function. Thus, a number of keys in the existing electronic device are reduced. Especially when the above keys are physical keys, after various functions are integrated in the first key, the purpose of reducing the number of keys in the electronic device can be more effectively achieved. Therefore, in the process of manufacturing the electronic device which performs the touch method according to the embodiment of the present disclosure, a number of implementing punching processes on the electronic device is reduced, thereby reducing a number of holes in the body of the electronic device. Thus, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, thereby improving the user experience.

Eleventh Embodiment

Figure 8:
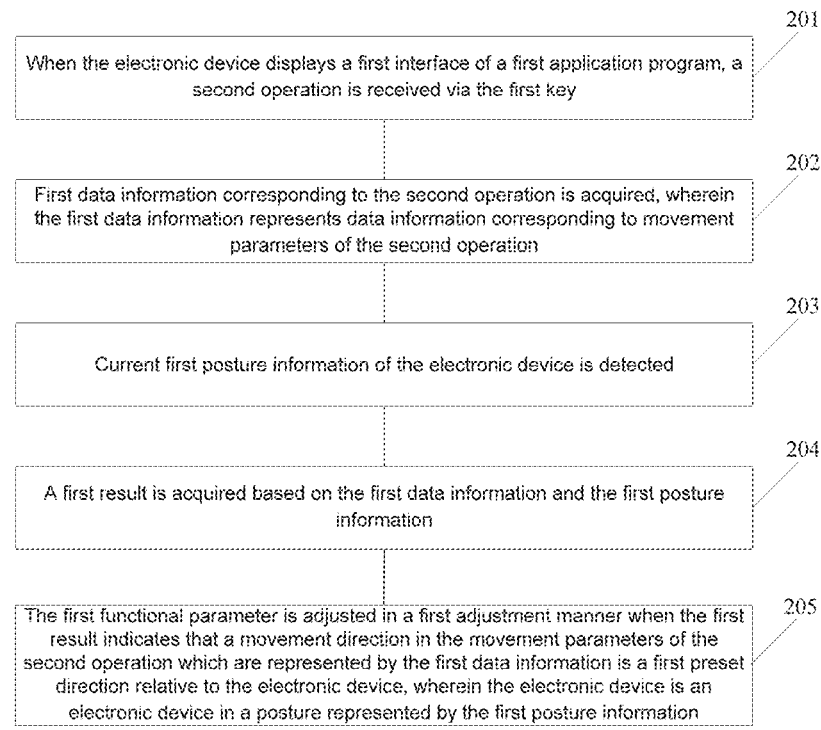
FIG. 8 is a second flowchart of implementing a touch method according to an embodiment of the present disclosure.

FIG. 8 is a second flowchart of implementing a touch method according to an embodiment of the present disclosure. The method is applied in an electronic device. The electronic device comprises a first key arranged in a first position of the electronic device, and can enable, in response to a first operation, the electronic device to generate a first executable instruction based on the first operation. The first key is a physical key or a virtual key which can enable the electronic device to perform the first executable instruction based on the first operation.

As shown in FIG. 8, the method comprises step 201. In step 201, when the electronic device displays a first interface of a first application program, a second operation is received via the first key.

In the present embodiment, the electronic device may also specifically be an intelligent electronic device such as a mobile phone, a tablet computer or the like.

In the present embodiment, no matter whether the first key is a physical key or a virtual key, the first key is operable to sense a touch operation. In this case, when the first operation is a single-click operation or a touch operation relative to the first key, the first key enables, in response to the first operation, the electronic device to generate a first executable instruction based on the first operation. For example, the electronic device is instructed according to the first executable instruction to display a first main interface in a display area thereof. That is, the first key may specifically be a home key, i.e., the first key has a home function. Alternatively, the electronic device is controlled according to the first executable instruction to exit the first interface or a first application program corresponding to the first interface, so that the electronic device returns to an upper-level interface corresponding to the current first interface. That is, the first key may specifically be a back key, i.e., the first key has a back function. Alternatively, the first key has both a home function and a back function.

In the present embodiment, a first touch sensing region is arranged in the first key. Thus, the first key can receive the second operation, i.e., a sliding operation, via the first touch sensing region, so as to adjust a first functional parameter of the electronic device in response to the second operation.

In the present embodiment, the first interface may be a display interface corresponding to the first application program. The first application program is a first type of application programs randomly installed in the electronic device which can be supported by the electronic device, for example, an application program corresponding to video play software. Correspondingly, the first interface displays corresponding display content in the video content.

In the present embodiment, a sensor unit may be arranged in the electronic device. Further, current posture information of the electronic device may be detected via the sensor unit. Thereby, a display direction of the display content in the display area of the electronic device is adjusted based on the posture information, so that the display direction corresponds to a gravity direction. Thus, even if the electronic device is in different postures, the user of the electronic device can view display content is a forward direction, to satisfy different user's requirements, thereby improving user experience. Further, the gravity sensing process may be achieved by the sensor unit via an integrated gravity sensor, an integrated gyroscope or the like.

In step 202, first data information corresponding to the second operation is acquired. The first data information represents data information corresponding to movement parameters of the second operation.

In the present embodiment, the movement parameters include but are not limited to a direction, a displacement, a speed or the like. Specifically, the first data information may represent a movement direction and a movement speed formed by the second operation relative to the electronic device in a first touch sensing region of the first key and may represent a movement displacement formed by the second operation on the first key. Therefore, acquiring, by the electronic device, first data information corresponding to the second operation may further comprise acquiring, by the electronic device, a movement direction of the second operation relative to the electronic device; and/or acquiring a movement speed of the second operation relative to the electronic device; and/or acquiring a movement displacement formed by the second operation on the first key or the like.

In step 203, current first posture information of the electronic device is detected.

In the present embodiment, the electronic device detects the current first posture information of its own. For example, the electronic device detects the current first posture information of its own via the sensor unit arranged therein. Specifically, when a gravity sensor or a gyroscope is integrated in the sensor unit, the electronic device detects the first posture information of its own via the gravity sensor or the gyroscope.

In step 204, a first result is acquired based on the first data information and the first posture information.

In the present embodiment, after the electronic device acquires the first data information and the first posture information, a movement direction of the second operation relative to the electronic device which is represented in the first data information is analyzed to acquire a first result, so that the first functional parameter of the electronic device is adjusted based on the first result; and/or a movement displacement formed by the second operation on the first key which is represented in the first data information is analyzed to acquire a first result which includes an adjustment amplitude, so that the first functional parameter of the electronic device is adjusted based on the adjustment amplitude in the first result; and/or a movement speed of the second operation relative to the electronic device in the first data information is analyzed to acquire a first result which includes an adjustment speed, so that the first functional parameter of the electronic device is adjusted based on the adjustment speed in the first result.

It should be noted that only several feasible manners are described in the above analysis process of acquiring the first result, and the feasible manners described above are merely used to explain the embodiment of the present disclosure, instead of limiting the embodiment of the present disclosure. In practical applications, the analysis process of acquiring the first result may be randomly set according to technical support and practical conditions thereof.

In step 205, the first functional parameter is adjusted in a first adjustment mode when the first result indicates that a movement direction in the movement parameters of the second operation which are represented by the first data information is a first preset direction relative to the electronic device, wherein the electronic device is an electronic device in a posture represented by the first posture information.

In the present embodiment, the first functional parameter may specifically be a volume parameter of the electronic device. Specifically, when the first functional parameter is a volume parameter, the electronic device can determine a manner of adjusting the volume of the electronic device based on the posture information of its own and the received movement parameters corresponding to the second operation. Thus, the manner of adjusting the volume is not fixed, and can be correspondingly changed based on the relationship between the posture information of the electronic device and the movement parameters of the second operation. Therefore, even if the electronic device is in different postures, the touch user experience is kept consistent, thereby improving the user experience.

Figure 9:
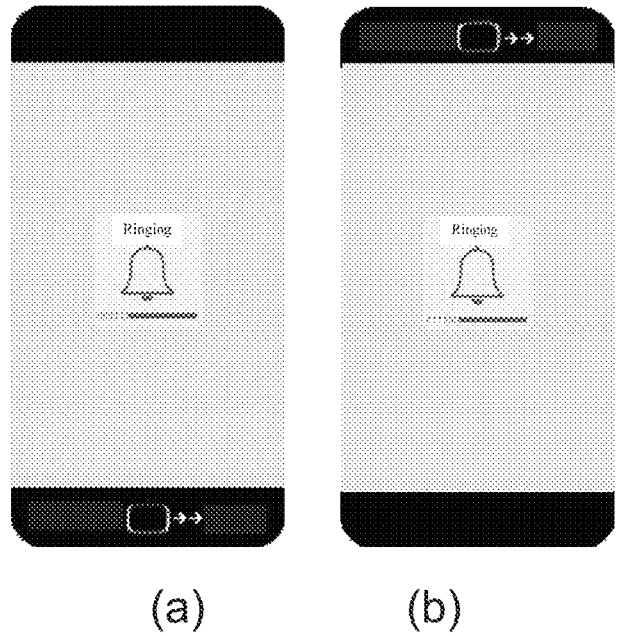
FIG. 9 is a first diagram of applying a touch method according to an embodiment of the present disclosure.

In the present embodiment, the manner of adjusting the first functional parameter is determined according to a positional relationship between the movement direction of the second operation relative to the electronic device and the posture of the electronic device. In this way, in a condition that the spatial reference coordinate system is unchanged, even if the first posture of the electronic device is changed (for example, as shown in FIG. 9, from a posture in FIG. 9(*a*) to a posture in FIG. 9(*b*)), as long as the movement direction of the second operation relative to the electronic device is unchanged, it can be ensured that the manner of adjusting the first functional parameter is unchanged. Thus, the touch user experience is kept consistent, thereby improving the user experience.

In the present embodiment, when the first result indicates that the movement direction in the movement parameters of the second operation which are represented by the first data information is a first direction and the electronic device is in a first posture represented by the first posture information, the first direction relative to the electronic device in the first posture is determined as the first preset direction.

Specifically, the first posture comprises a first sub-posture and a second sub-posture. Correspondingly, when the first result indicates that the movement direction in the movement parameters of the second operation which are represented by the first data information is a first direction and the electronic device is in a first sub-posture or a second sub-posture represented by the first posture information, the first direction relative to the electronic device in the first sub-posture or the second sub-posture is determined as the first preset direction.

The implementation of the present disclosure will be further described in detail below in conjunction with application scenarios.

First Application Scenario

FIG. 9 is a first diagram of applying a touch method according to an embodiment of the present disclosure. FIG. 9(*a*) is a first diagram of applying the touch method according to an embodiment of the present disclosure when the electronic device is in a first sub-posture. FIG. 9(*b*) is a first diagram of applying the touch method according to an embodiment of the present disclosure when the electronic device is in a second sub-posture. It is assumed that the electronic device comprises a first key, and the first key is arranged in the middle below a display area of the electronic device. The first key is operable to sense a touch operation. A first touch sensing region is arranged in the first key, and the first key has a home function. As shown in FIG. 9, when a first interface of a first application program is displayed in the display area of the electronic device, a second operation is received via the first key. The second operation is a slide operation performed by an operating body in the first touch sensing region of the first key in a direction as indicated by the arrows in FIGS. 9(*a*) and 9(*b*).

A movement direction of the second operation in the first sensing region is acquired as the first direction. Obviously, the direction as indicated by the arrows in FIGS. 9(*a*) and 9(*b*) is the first direction.

The electronic device detects that the first posture information of its own is the first sub-posture or the second sub-posture, which are collectively referred to as the first posture.

A first result is acquired based on the positional relationship between the first direction and the first sub-posture or the positional relationship between the first direction and the second sub-posture.

Obviously, the first result indicates that the movement direction relative to the electronic device in the movement parameters of the second operation is the first direction.

Further, it is assumed that the first direction is the same as the first preset direction. In this case, the electronic device adjusts the first functional parameter in the first adjustment mode according to the first result. Specifically, the electronic device increases the first functional parameter according to the first result.

In the touch method according to the embodiment of the present disclosure, when the electronic device displays a first interface of a first application program, the second operation is received via the first key of the electronic device, and the movement parameters of the second operation relative to the electronic device are determined based on the second operation. Thereby, the manner of adjusting the first functional parameter of the electronic device is determined based on a relationship between the movement parameters of the second operation relative to the electronic device and the detected current posture information of the electronic device. Thus, even if the first key is a physical key, the manner of adjusting the first functional parameter is not fixed. Therefore, the touch method according to the embodiment of the present disclosure can flexibly adjust the first functional parameter based on the posture information of the electronic device and the movement parameters of the second operation relative to the electronic device to satisfy the user's requirements, thereby improving the user experience.

In addition, as the first key may be a home key having a home function or a back key having a back function or a key having both a home function and a back function, after the first key incorporates the function of adjusting the first functional parameter, the key in the existing electronic device for adjusting the first functional parameter can be removed. That is, the key for adjusting the first functional parameter is incorporated with the existing home key, or the key for adjusting the first functional parameter is incorporated with the existing back key, or key for adjusting the first functional parameter is incorporated with the key having both a home function and a back function. Thus, a number of keys in the existing electronic device are reduced. Especially when the above keys are physical keys, after various functions are integrated in the first key, the purpose of reducing the number of keys in the electronic device can be more effectively achieved. Therefore, in the process of manufacturing the electronic device which performs the touch method according to the embodiment of the present disclosure, a number of implementing punching processes on the electronic device is reduced, thereby reducing a number of holes in the body of the electronic device. Thus, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, thereby improving the user experience.

Twelfth Embodiment

Figure 10:
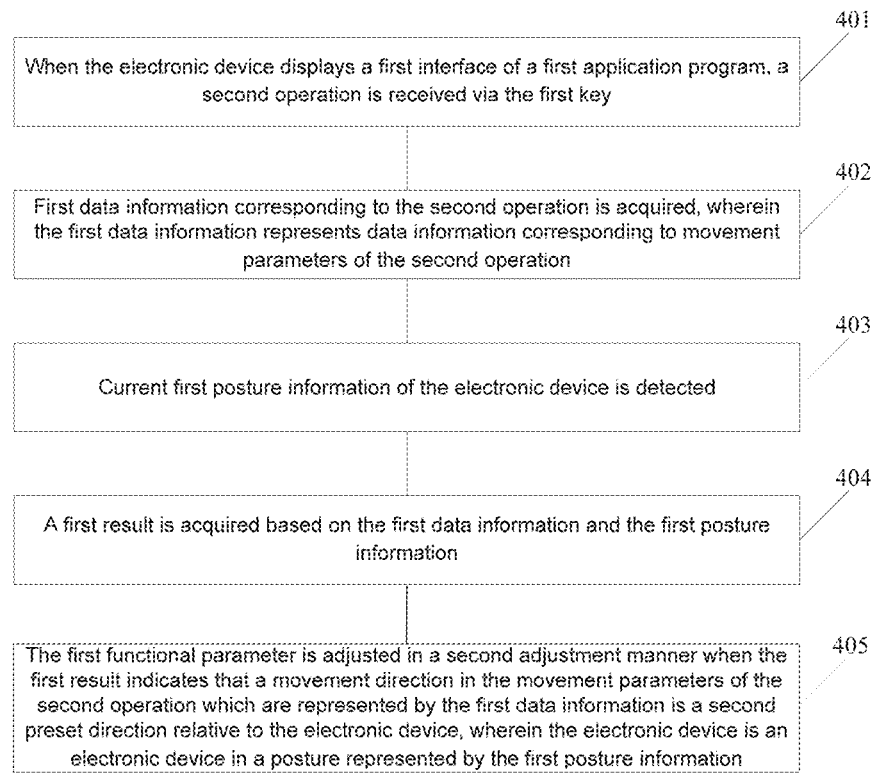
FIG. 10 is a third flowchart of implementing a touch method according to an embodiment of the present disclosure.

FIG. 10 is a third flowchart of implementing a touch method according to an embodiment of the present disclosure. The method is applied in an electronic device. The electronic device comprises a first key arranged in a first position of the electronic device, and can enable, in response to a first operation, the electronic device to generate a first executable instruction based on the first operation. The first key is a physical key or a virtual key which can enable the electronic device to perform the first executable instruction based on the first operation.

As shown in FIG. 10, the method comprises step 401. In step 401, when the electronic device displays a first interface of a first application program, a second operation is received via the first key.

In the present embodiment, the electronic device may also specifically be an intelligent electronic device such as a mobile phone, a tablet computer or the like.

In the present embodiment, no matter whether the first key is a physical key or a virtual key, the first key is operable to sense a touch operation. In this case, when the first operation is a single-click operation or a touch operation relative to the first key, the first key enables, in response to the first operation, the electronic device to generate a first executable instruction based on the first operation. For example, the electronic device is instructed according to the first executable instruction to display a first main interface in a display area thereof. That is, the first key may specifically be a home key, i.e., the first key has a home function. Alternatively, the electronic device is controlled according to the first executable instruction to exit the first interface or a first application program corresponding to the first interface, so that the electronic device returns to an upper-level interface corresponding to the current first interface. That is, the first key may specifically be a back key, i.e., the first key has a back function. Alternatively, the first key has both a home function and a back function.

In the present embodiment, a first touch sensing region is arranged in the first key. Thus, the first key can receive the second operation, i.e., a sliding operation, via the first touch sensing region, so as to adjust a first functional parameter of the electronic device in response to the second operation.

In the present embodiment, the first interface may be a display interface corresponding to the first application program. The first application program is a first type of application programs randomly installed in the electronic device which can be supported by the electronic device, for example, an application program corresponding to video play software. Correspondingly, the first interface displays corresponding display content in the video content.

In the present embodiment, a sensor unit may be arranged in the electronic device. Further, current posture information of the electronic device may be detected via the sensor unit. Thereby, a display direction of the display content in the display area of the electronic device is adjusted based on the posture information, so that the display direction corresponds to a gravity direction. Thus, even if the electronic device is in different postures, the user of the electronic device can view display content is a forward direction, to satisfy different user's requirements, thereby improving user experience. Further, the gravity sensing process may be achieved by the sensor unit via an integrated gravity sensor, an integrated gyroscope or the like.

In step 402, first data information corresponding to the second operation is acquired. The first data information represents data information corresponding to movement parameters of the second operation.

In the present embodiment, the movement parameters include but are not limited to a direction, a displacement, a speed or the like. Specifically, the first data information may represent a movement direction and a movement speed formed by the second operation relative to the electronic device in a first touch sensing region of the first key and may represent a movement displacement formed by the second operation on the first key. Therefore, acquiring, by the electronic device, first data information corresponding to the second operation may further comprise acquiring, by the electronic device, a movement direction of the second operation relative to the electronic device; and/or acquiring a movement speed of the second operation relative to the electronic device; and/or acquiring a movement displacement formed by the second operation on the first key or the like.

In step 403, current first posture information of the electronic device is detected.

In the present embodiment, the electronic device detects the current first posture information of its own. For example, the electronic device detects the current first posture information of its own via the sensor unit arranged therein. Specifically, when a gravity sensor or a gyroscope is integrated in the sensor unit, the electronic device detects the first posture information of its own via the gravity sensor or the gyroscope.

In step 404, a first result is acquired based on the first data information and the first posture information.

In the present embodiment, after the electronic device acquires the first data information and the first posture information, a movement direction of the second operation relative to the electronic device which is represented in the first data information is analyzed to acquire a first result, so that the first functional parameter of the electronic device is adjusted based on the first result; and/or a movement displacement formed by the second operation on the first key which is represented in the first data information is analyzed to acquire a first result which includes an adjustment amplitude, so that the first functional parameter of the electronic device is adjusted based on the adjustment amplitude in the first result; and/or a movement speed of the second operation relative to the electronic device in the first data information is analyzed to acquire a first result which includes an adjustment speed, so that the first functional parameter of the electronic device is adjusted based on the adjustment speed in the first result.

It should be noted that only several feasible manners are described in the above analysis process of acquiring the first result, and the feasible manners described above are merely used to explain the embodiment of the present disclosure, instead of limiting the embodiment of the present disclosure. In practical applications, the analysis process of acquiring the first result may be randomly set according to technical support and practical conditions thereof.

In step 405, the first functional parameter is adjusted in a second adjustment mode when the first result indicates that a movement direction in the movement parameters of the second operation which are represented by the first data information is a second preset direction relative to the electronic device, wherein the electronic device is an electronic device in a posture represented by the first posture information.

In the present embodiment, the first functional parameter may specifically be a volume parameter of the electronic device. Specifically, when the first functional parameter is a volume parameter, the electronic device can determine a manner of adjusting the volume of the electronic device based on the posture information of its own and the received movement parameters corresponding to the second operation. Thus, the manner of adjusting the volume is not fixed, and can be correspondingly changed based on the relationship between the posture information of the electronic device and the movement parameters of the second operation. Therefore, even if the electronic device is in different postures, the touch user experience is kept consistent, thereby improving the user experience.

Figure 11:
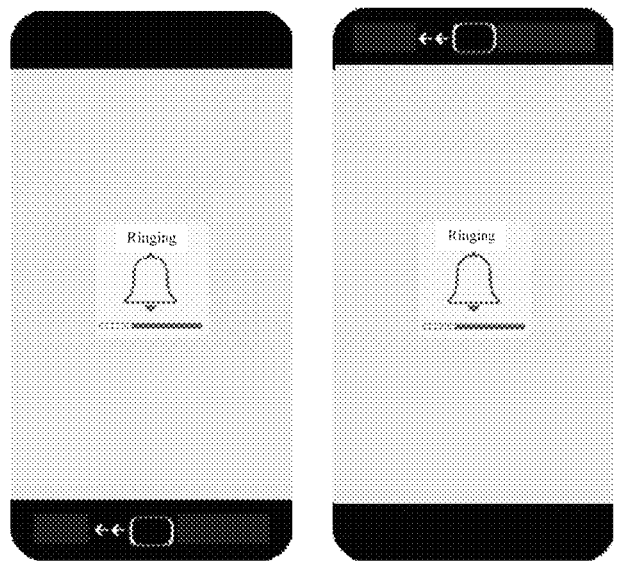
FIG. 11 is a second diagram of applying a touch method according to an embodiment of the present disclosure.

In the present embodiment, the manner of adjusting the first functional parameter is determined according to a positional relationship between the movement direction of the second operation relative to the electronic device and the posture of the electronic device. In this way, in a condition that the spatial reference coordinate system is unchanged, even if the first posture of the electronic device is changed (for example, as shown in FIG. 11, from a posture in FIG. 11(*a*) to a posture in FIG. 11(*b*)), as long as the movement direction of the second operation relative to the electronic device is unchanged, it can be ensured that the manner of adjusting the first functional parameter is unchanged. Thus, the touch user experience is kept consistent, thereby improving the user experience.

In the present embodiment, when the first result indicates that the movement direction in the movement parameters of the second operation which are represented by the first data information is a second direction and the electronic device is in a first posture represented by the first posture information, the second direction relative to the electronic device in the first posture is determined as the second preset direction.

Specifically, the first posture comprises a first sub-posture and a second sub-posture. Correspondingly, when the first result indicates that the movement direction in the movement parameters of the second operation which are represented by the first data information is a second direction and the electronic device is in a first sub-posture or a second sub-posture represented by the first posture information, the second direction relative to the electronic device in the first sub-posture or the second sub-posture is determined as the second preset direction.

The implementation of the present disclosure will be further described in detail below in conjunction with application scenarios.

Second Application Scenario

FIG. 11 is a second diagram of applying a touch method according to an embodiment of the present disclosure. FIG. 11(*a*) is a second diagram of applying the touch method according to an embodiment of the present disclosure when the electronic device is in a first sub-posture. FIG. 11(*b*) is a second diagram of applying the touch method according to an embodiment of the present disclosure when the electronic device is in a second sub-posture. It is assumed that the electronic device comprises a first key, and the first key is arranged in the middle below a display area of the electronic device. The first key is operable to sense a touch operation. A first touch sensing region is arranged in the first key, and the first key has a home function. As shown in FIG. 11, when a first interface of a first application program is displayed in the display area of the electronic device, a second operation is received via the first key. The second operation is a slide operation performed by an operating body in the first touch sensing region of the first key in a direction as indicated by the arrows in FIGS. 11(*a*) and 11(*b*).

A movement direction of the second operation in the first sensing region is acquired as the second direction. Obviously, the direction as indicated by the arrows in FIGS. 11(*a*) and 11(*b*) is the second direction. The electronic device detects that the first posture information of its own is the first sub-posture or the second sub-posture, which are collectively referred to as the first posture.

A first result is acquired based on the positional relationship between the second direction and the first sub-posture or the positional relationship between the second direction and the second sub-posture.

Obviously, the first result indicates that the movement direction relative to the electronic device in the movement parameters of the second operation is the second direction. Further, it is assumed that the second direction is the same as the second preset direction. In this case, the electronic device adjusts the first functional parameter in the second adjustment mode according to the first result. Specifically, the electronic device decreases the first functional parameter according to the first result.

In the touch method according to the embodiment of the present disclosure, when the electronic device displays a first interface of a first application program, the second operation is received via the first key of the electronic device, and the movement parameters of the second operation relative to the electronic device are determined based on the second operation. Thereby, the manner of adjusting the first functional parameter of the electronic device is determined based on a relationship between the movement parameters of the second operation relative to the electronic device and the detected current posture information of the electronic device. Thus, even if the first key is a physical key, the manner of adjusting the first functional parameter is not fixed. Therefore, the touch method according to the embodiment of the present disclosure can flexibly adjust the first functional parameter based on the posture information of the electronic device and the movement parameters of the second operation relative to the electronic device to satisfy the user's requirements, thereby improving the user experience.

In addition, as the first key may be a home key having a home function or a back key having a back function or a key having both a home function and a back function, after the first key incorporates the function of adjusting the first functional parameter, the key in the existing electronic device for adjusting the first functional parameter can be removed. That is, the key for adjusting the first functional parameter is incorporated with the existing home key, or the key for adjusting the first functional parameter is incorporated with the existing back key, or key for adjusting the first functional parameter is incorporated with the key having both a home function and a back function. Thus, a number of keys in the existing electronic device are reduced. Especially when the above keys are physical keys, after various functions are integrated in the first key, the purpose of reducing the number of keys in the electronic device can be more effectively achieved. Therefore, in the process of manufacturing the electronic device which performs the touch method according to the embodiment of the present disclosure, a number of implementing punching processes on the electronic device is reduced, thereby reducing a number of holes in the body of the electronic device. Thus, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, thereby improving the user experience.

Thirteenth Embodiment

Figure 12:
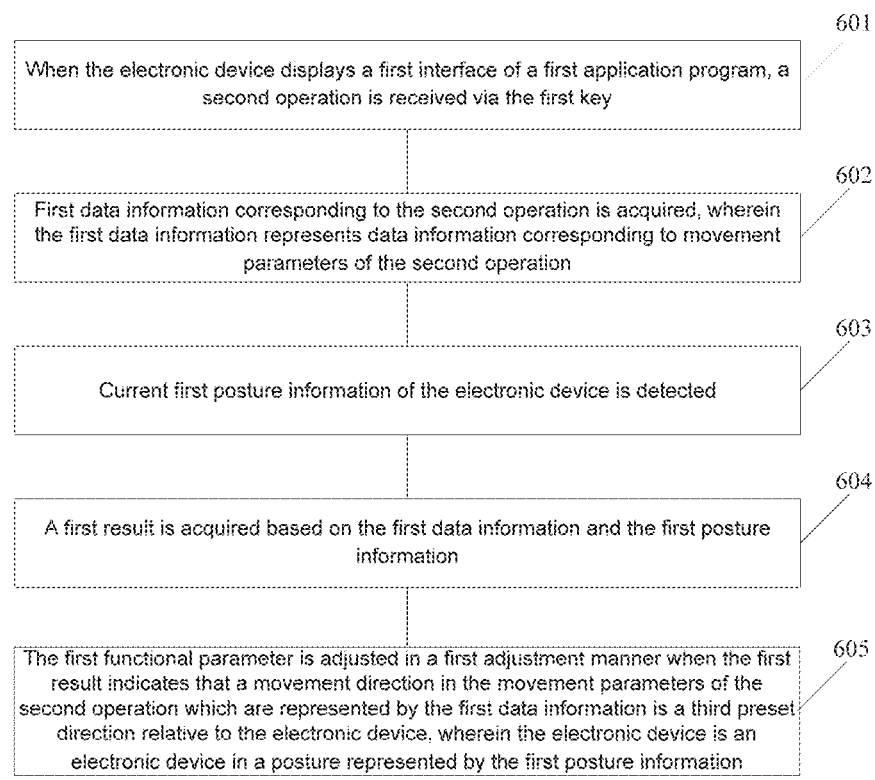
FIG. 12 is a fourth flowchart of implementing a touch method according to an embodiment of the present disclosure.

FIG. 12 is a fourth flowchart of implementing a touch method according to an embodiment of the present disclosure. The method is applied in an electronic device. The electronic device comprises a first key arranged in a first position of the electronic device, and can enable, in response to a first operation, the electronic device to generate a first executable instruction based on the first operation. The first key is a physical key or a virtual key which can enable the electronic device to perform the first executable instruction based on the first operation.

As shown in FIG. 12, the method comprises step 601. In step 601, when the electronic device displays a first interface of a first application program, a second operation is received via the first key.

In the present embodiment, the electronic device may also specifically be an intelligent electronic device such as a mobile phone, a tablet computer or the like.

In the present embodiment, no matter whether the first key is a physical key or a virtual key, the first key is operable to sense a touch operation. In this case, when the first operation is a single-click operation or a touch operation relative to the first key, the first key enables, in response to the first operation, the electronic device to generate a first executable instruction based on the first operation. For example, the electronic device is instructed according to the first executable instruction to display a first main interface in a display area thereof. That is, the first key may specifically be a home key, i.e., the first key has a home function. Alternatively, the electronic device is controlled according to the first executable instruction to exit the first interface or a first application program corresponding to the first interface, so that the electronic device returns to an upper-level interface corresponding to the current first interface. That is, the first key may specifically be a back key, i.e., the first key has a back function. Alternatively, the first key has both a home function and a back function.

In the present embodiment, a first touch sensing region is arranged in the first key. Thus, the first key can receive the second operation, i.e., a sliding operation, via the first touch sensing region, so as to adjust a first functional parameter of the electronic device in response to the second operation.

In the present embodiment, the first interface may be a display interface corresponding to the first application program. The first application program is a first type of application programs randomly installed in the electronic device which can be supported by the electronic device, for example, an application program corresponding to video play software. Correspondingly, the first interface displays corresponding display content in the video content.

In the present embodiment, a sensor unit may be arranged in the electronic device. Further, current posture information of the electronic device may be detected via the sensor unit. Thereby, a display direction of the display content in the display area of the electronic device is adjusted based on the posture information, so that the display direction corresponds to a gravity direction. Thus, even if the electronic device is in different postures, the user of the electronic device can view display content is a forward direction, to satisfy different user's requirements, thereby improving user experience. Further, the gravity sensing process may be achieved by the sensor unit via an integrated gravity sensor, an integrated gyroscope or the like.

In step 602, first data information corresponding to the second operation is acquired. The first data information represents data information corresponding to movement parameters of the second operation.

In the present embodiment, the movement parameters include but are not limited to a direction, a displacement, a speed or the like. Specifically, the first data information may represent a movement direction and a movement speed formed by the second operation relative to the electronic device in a first touch sensing region of the first key and may represent a movement displacement formed by the second operation on the first key. Therefore, acquiring, by the electronic device, first data information corresponding to the second operation may further comprise acquiring, by the electronic device, a movement direction of the second operation relative to the electronic device; and/or acquiring a movement speed of the second operation relative to the electronic device; and/or acquiring a movement displacement formed by the second operation on the first key or the like.

In step 603, current first posture information of the electronic device is detected.

In the present embodiment, the electronic device detects the current first posture information of its own. For example, the electronic device detects the current first posture information of its own via the sensor unit arranged therein. Specifically, when a gravity sensor or a gyroscope is integrated in the sensor unit, the electronic device detects the first posture information of its own via the gravity sensor or the gyroscope.

In step 604, a first result is acquired based on the first data information and the first posture information.

In the present embodiment, after the electronic device acquires the first data information and the first posture information, a movement direction of the second operation relative to the electronic device which is represented in the first data information is analyzed to acquire a first result, so that the first functional parameter of the electronic device is adjusted based on the first result; and/or a movement displacement formed by the second operation on the first key which is represented in the first data information is analyzed to acquire a first result which includes an adjustment amplitude, so that the first functional parameter of the electronic device is adjusted based on the adjustment amplitude in the first result; and/or a movement speed of the second operation relative to the electronic device in the first data information is analyzed to acquire a first result which includes an adjustment speed, so that the first functional parameter of the electronic device is adjusted based on the adjustment speed in the first result.

It should be noted that only several feasible manners are described in the above analysis process of acquiring the first result, and the feasible manners described above are merely used to explain the embodiment of the present disclosure, instead of limiting the embodiment of the present disclosure. In practical applications, the analysis process of acquiring the first result may be randomly set according to technical support and practical conditions thereof.

In step 605, the first functional parameter is adjusted in a first adjustment mode when the first result indicates that a movement direction in the movement parameters of the second operation which are represented by the first data information is a third preset direction relative to the electronic device, wherein the electronic device is an electronic device in a posture represented by the first posture information.

In the present embodiment, the first functional parameter may specifically be a volume parameter of the electronic device. Specifically, when the first functional parameter is a volume parameter, the electronic device can determine a manner of adjusting the volume of the electronic device based on the posture information of its own and the received movement parameters corresponding to the second operation. Thus, the manner of adjusting the volume is not fixed, and can be correspondingly changed based on the relationship between the posture information of the electronic device and the movement parameters of the second operation. Therefore, even if the electronic device is in different postures, the touch user experience is kept consistent, thereby improving the user experience.

Figure 13:
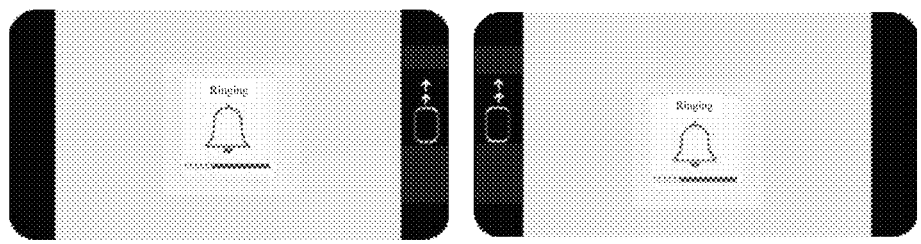
FIG. 13 is a third diagram of applying a touch method according to an embodiment of the present disclosure.

In the present embodiment, the manner of adjusting the first functional parameter is determined according to a positional relationship between the movement direction of the second operation relative to the electronic device and the posture of the electronic device. In this way, in a condition that the spatial reference coordinate system is unchanged, even if the first posture of the electronic device is changed (for example, as shown in FIG. 13, from a posture in FIG. 13(*a*) to a posture in FIG. 13(*b*)), as long as the movement direction of the second operation relative to the electronic device is unchanged, it can be ensured that the manner of adjusting the first functional parameter is unchanged. Thus, the touch user experience is kept consistent, thereby improving the user experience.

In the present embodiment, when the first result indicates that the movement direction in the movement parameters of the second operation which are represented by the first data information is a third direction and the electronic device is in a second posture represented by the first posture information, the third direction relative to the electronic device in the second posture is determined as the third preset direction.

Specifically, the second posture comprises a third sub-posture and a fourth sub-posture. Correspondingly, when the first result indicates that the movement direction in the movement parameters of the second operation which are represented by the first data information is a third direction and the electronic device is in a third sub-posture or a fourth sub-posture represented by the first posture information, the third direction relative to the electronic device in the third sub-posture or the fourth sub-posture is determined as the third preset direction.

The implementation of the present disclosure will be further described in detail below in conjunction with application scenarios.

Third Application Scenario

FIG. 13 is a third diagram of applying a touch method according to an embodiment of the present disclosure. FIG. 13(*a*) is a first diagram of applying the touch method according to an embodiment of the present disclosure when the electronic device is in a third sub-posture. FIG. 13(*b*) is a first diagram of applying the touch method according to an embodiment of the present disclosure when the electronic device is in a fourth sub-posture. It is assumed that the electronic device comprises a first key, and the first key is arranged in the middle below a display area of the electronic device. The first key is operable to sense a touch operation. A first touch sensing region is arranged in the first key, and the first key has a home function. As shown in FIG. 13, when a first interface of a first application program is displayed in the display area of the electronic device, a second operation is received via the first key. The second operation is a slide operation performed by an operating body in the first touch sensing region of the first key in a direction as indicated by the arrows in FIGS. 13(*a*) and 13(*b*).

A movement direction of the second operation in the first sensing region is acquired as the third direction. Obviously, the direction as indicated by the arrows in FIGS. 13(*a*) and 13(*b*) is the third direction.

The electronic device detects that the first posture information of its own is the third sub-posture or the fourth sub-posture, which are collectively referred to as the second posture.

A first result is acquired based on the positional relationship between the third direction and the third sub-posture or the positional relationship between the third direction and the fourth sub-posture.

Obviously, the first result indicates that the movement direction relative to the electronic device in the movement parameters of the second operation is the third direction. Further, it is assumed that the third direction is the same as the third preset direction. In this case, the electronic device adjusts the first functional parameter in the first adjustment mode according to the first result. Specifically, the electronic device increases the first functional parameter according to the first result.

In the touch method according to the embodiment of the present disclosure, when the electronic device displays a first interface of a first application program, the second operation is received via the first key of the electronic device, and the movement parameters of the second operation relative to the electronic device are determined based on the second operation. Thereby, the manner of adjusting the first functional parameter of the electronic device is determined based on a relationship between the movement parameters of the second operation relative to the electronic device and the detected current posture information of the electronic device. Thus, even if the first key is a physical key, the manner of adjusting the first functional parameter is not fixed. Therefore, the touch method according to the embodiment of the present disclosure can flexibly adjust the first functional parameter based on the posture information of the electronic device and the movement parameters of the second operation relative to the electronic device to satisfy the user's requirements, thereby improving the user experience.

In addition, as the first key may be a home key having a home function or a back key having a back function or a key having both a home function and a back function, after the first key incorporates the function of adjusting the first functional parameter, the key in the existing electronic device for adjusting the first functional parameter can be removed. That is, the key for adjusting the first functional parameter is incorporated with the existing home key, or the key for adjusting the first functional parameter is incorporated with the existing back key, or key for adjusting the first functional parameter is incorporated with the key having both a home function and a back function. Thus, a number of keys in the existing electronic device are reduced. Especially when the above keys are physical keys, after various functions are integrated in the first key, the purpose of reducing the number of keys in the electronic device can be more effectively achieved. Therefore, in the process of manufacturing the electronic device which performs the touch method according to the embodiment of the present disclosure, a number of implementing punching processes on the electronic device is reduced, thereby reducing a number of holes in the body of the electronic device. Thus, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, thereby improving the user experience.

Fourteenth Embodiment

Figure 14:
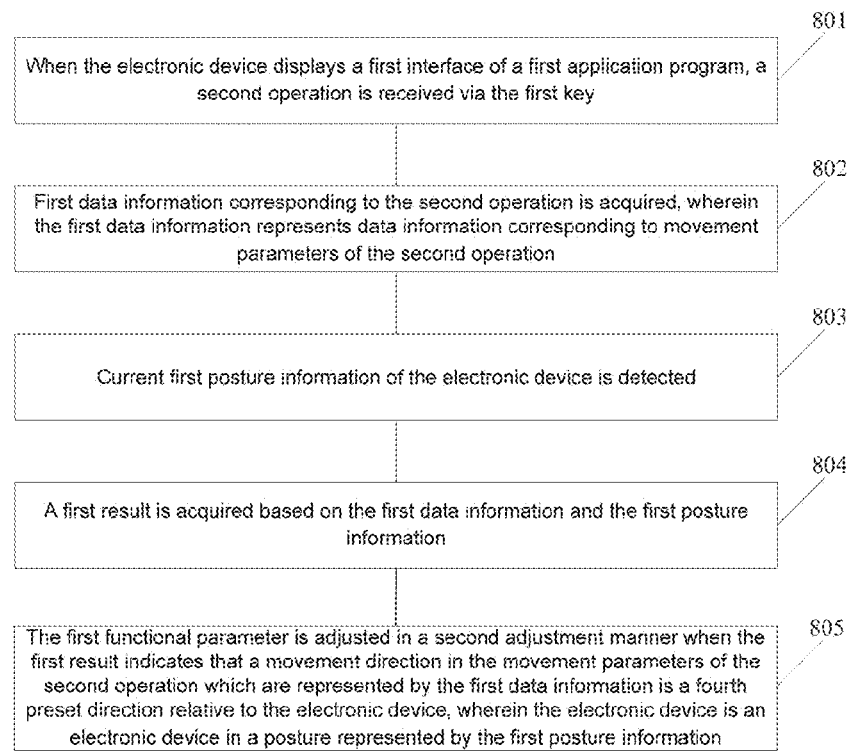
FIG. 14 is a fifth flowchart of implementing a touch method according to an embodiment of the present disclosure.

FIG. 14 is a fifth flowchart of implementing a touch method according to an embodiment of the present disclosure. The method is applied in an electronic device. The electronic device comprises a first key arranged in a first position of the electronic device, and can enable, in response to a first operation, the electronic device to generate a first executable instruction based on the first operation. The first key is a physical key or a virtual key which can enable the electronic device to perform the first executable instruction based on the first operation.

As shown in FIG. 14, the method comprises step 801. In step 801, when the electronic device displays a first interface of a first application program, a second operation is received via the first key.

In the present embodiment, the electronic device may also specifically be an intelligent electronic device such as a mobile phone, a tablet computer or the like.

In the present embodiment, no matter whether the first key is a physical key or a virtual key, the first key is operable to sense a touch operation. In this case, when the first operation is a single-click operation or a touch operation relative to the first key, the first key enables, in response to the first operation, the electronic device to generate a first executable instruction based on the first operation. For example, the electronic device is instructed according to the first executable instruction to display a first main interface in a display area thereof. That is, the first key may specifically be a home key, i.e., the first key has a home function. Alternatively, the electronic device is controlled according to the first executable instruction to exit the first interface or a first application program corresponding to the first interface, so that the electronic device returns to an upper-level interface corresponding to the current first interface. That is, the first key may specifically be a back key, i.e., the first key has a back function. Alternatively, the first key has both a home function and a back function.

In the present embodiment, a first touch sensing region is arranged in the first key. Thus, the first key can receive the second operation, i.e., a sliding operation, via the first touch sensing region, so as to adjust a first functional parameter of the electronic device in response to the second operation.

In the present embodiment, the first interface may be a display interface corresponding to the first application program. The first application program is a first type of application programs randomly installed in the electronic device which can be supported by the electronic device, for example, an application program corresponding to video play software. Correspondingly, the first interface displays corresponding display content in the video content.

In the present embodiment, a sensor unit may be arranged in the electronic device. Further, current posture information of the electronic device may be detected via the sensor unit. Thereby, a display direction of the display content in the display area of the electronic device is adjusted based on the posture information, so that the display direction corresponds to a gravity direction. Thus, even if the electronic device is in different postures, the user of the electronic device can view display content is a forward direction, to satisfy different user's requirements, thereby improving user experience. Further, the gravity sensing process may be achieved by the sensor unit via an integrated gravity sensor, an integrated gyroscope or the like.

In step 802, first data information corresponding to the second operation is acquired. The first data information represents data information corresponding to movement parameters of the second operation.

In the present embodiment, the movement parameters include but are not limited to a direction, a displacement, a speed or the like. Specifically, the first data information may represent a movement direction and a movement speed formed by the second operation relative to the electronic device in a first touch sensing region of the first key and may represent a movement displacement formed by the second operation on the first key. Therefore, acquiring, by the electronic device, first data information corresponding to the second operation may further comprise acquiring, by the electronic device, a movement direction of the second operation relative to the electronic device; and/or acquiring a movement speed of the second operation relative to the electronic device; and/or acquiring a movement displacement formed by the second operation on the first key or the like.

In step 803, current first posture information of the electronic device is detected.

In the present embodiment, the electronic device detects the current first posture information of its own. For example, the electronic device detects the current first posture information of its own via the sensor unit arranged therein. Specifically, when a gravity sensor or a gyroscope is integrated in the sensor unit, the electronic device detects the first posture information of its own via the gravity sensor or the gyroscope.

In step 804, a first result is acquired based on the first data information and the first posture information.

In the present embodiment, after the electronic device acquires the first data information and the first posture information, a movement direction of the second operation relative to the electronic device which is represented in the first data information is analyzed to acquire a first result, so that the first functional parameter of the electronic device is adjusted based on the first result; and/or a movement displacement formed by the second operation on the first key which is represented in the first data information is analyzed to acquire a first result which includes an adjustment amplitude, so that the first functional parameter of the electronic device is adjusted based on the adjustment amplitude in the first result; and/or a movement speed of the second operation relative to the electronic device in the first data information is analyzed to acquire a first result which includes an adjustment speed, so that the first functional parameter of the electronic device is adjusted based on the adjustment speed in the first result.

It should be noted that only several feasible manners are described in the above analysis process of acquiring the first result, and the feasible manners described above are merely used to explain the embodiment of the present disclosure, instead of limiting the embodiment of the present disclosure. In practical applications, the analysis process of acquiring the first result may be randomly set according to technical support and practical conditions thereof.

In step 805, the first functional parameter is adjusted in a second adjustment mode when the first result indicates that a movement direction in the movement parameters of the second operation which are represented by the first data information is a fourth preset direction relative to the electronic device, wherein the electronic device is an electronic device in a posture represented by the first posture information.

In the present embodiment, the first functional parameter may specifically be a volume parameter of the electronic device. Specifically, when the first functional parameter is a volume parameter, the electronic device can determine a manner of adjusting the volume of the electronic device based on the posture information of its own and the received movement parameters corresponding to the second operation. Thus, the manner of adjusting the volume is not fixed, and can be correspondingly changed based on the relationship between the posture information of the electronic device and the movement parameters of the second operation. Therefore, even if the electronic device is in different postures, the touch user experience is kept consistent, thereby improving the user experience.

Figure 15:
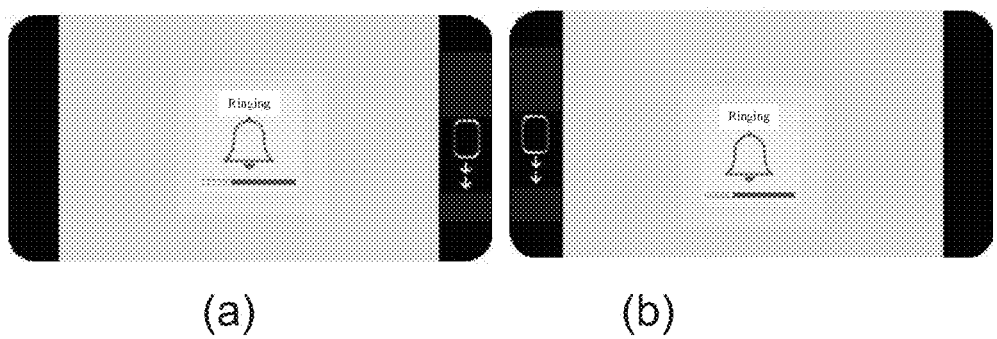
FIG. 15 is a fourth diagram of applying a touch method according to an embodiment of the present disclosure.

In the present embodiment, the manner of adjusting the first functional parameter is determined according to a positional relationship between the movement direction of the second operation relative to the electronic device and the posture of the electronic device. In this way, in a condition that the spatial reference coordinate system is unchanged, even if the first posture of the electronic device is changed (for example, as shown in FIG. 15, from a posture in FIG. 15(*a*) to a posture in FIG. 15(*b*)), as long as the movement direction of the second operation relative to the electronic device is unchanged, it can be ensured that the manner of adjusting the first functional parameter is unchanged. Thus, the touch user experience is kept consistent, thereby improving the user experience.

In the present embodiment, when the first result indicates that the movement direction in the movement parameters of the second operation which are represented by the first data information is a fourth direction and the electronic device is in a second posture represented by the first posture information, the fourth direction relative to the electronic device in the second posture is determined as the fourth preset direction.

Specifically, the second posture comprises a third sub-posture and a fourth sub-posture. Correspondingly, when the first result indicates that the movement direction in the movement parameters of the second operation which are represented by the first data information is a fourth direction and the electronic device is in a third sub-posture or a fourth sub-posture represented by the first posture information, the fourth direction relative to the electronic device in the third sub-posture or the fourth sub-posture is determined as the fourth preset direction.

The implementation of the present disclosure will be further described in detail below in conjunction with application scenarios.

Fourth Application Scenario

FIG. 15 is a fourth diagram of applying a touch method according to an embodiment of the present disclosure. FIG. 15(*a*) is a second diagram of applying the touch method according to an embodiment of the present disclosure when the electronic device is in a third sub-posture. FIG. 15(*b*) is a second diagram of applying the touch method according to an embodiment of the present disclosure when the electronic device is in a fourth sub-posture. It is assumed that the electronic device comprises a first key, and the first key is arranged in the middle below a display area of the electronic device. The first key is operable to sense a touch operation. A first touch sensing region is arranged in the first key, and the first key has a home function. As shown in FIG. 15, when a first interface of a first application program is displayed in the display area of the electronic device, a second operation is received via the first key. The second operation is a slide operation performed by an operating body in the first touch sensing region of the first key in a direction as indicated by the arrows in FIGS. 15(*a*) and 15(*b*).

A movement direction of the second operation in the first sensing region is acquired as the fourth direction. Obviously, the direction as indicated by the arrows in FIGS. 15(*a*) and 15(*b*) is the fourth direction.

The electronic device detects that the first posture information of its own is the third sub-posture or the fourth sub-posture, which are collectively referred to as the second posture.

A first result is acquired based on the positional relationship between the fourth direction and the third sub-posture or the positional relationship between the fourth direction and the fourth sub-posture.

Obviously, the first result indicates that the movement direction relative to the electronic device in the movement parameters of the second operation is the fourth direction. Further, it is assumed that the fourth direction is the same as the fourth preset direction. In this case, the electronic device adjusts the first functional parameter in the second adjustment mode according to the first result. Specifically, the electronic device decreases the first functional parameter according to the first result.

In the touch method according to the embodiment of the present disclosure, when the electronic device displays a first interface of a first application program, the second operation is received via the first key of the electronic device, and the movement parameters of the second operation relative to the electronic device are determined based on the second operation. Thereby, the manner of adjusting the first functional parameter of the electronic device is determined based on a relationship between the movement parameters of the second operation relative to the electronic device and the detected current posture information of the electronic device. Thus, even if the first key is a physical key, the manner of adjusting the first functional parameter is not fixed. Therefore, the touch method according to the embodiment of the present disclosure can flexibly adjust the first functional parameter based on the posture information of the electronic device and the movement parameters of the second operation relative to the electronic device to satisfy the user's requirements, thereby improving the user experience.

In addition, as the first key may be a home key having a home function or a back key having a back function or a key having both a home function and a back function, after the first key incorporates the function of adjusting the first functional parameter, the key in the existing electronic device for adjusting the first functional parameter can be removed. That is, the key for adjusting the first functional parameter is incorporated with the existing home key, or the key for adjusting the first functional parameter is incorporated with the existing back key, or key for adjusting the first functional parameter is incorporated with the key having both a home function and a back function. Thus, a number of keys in the existing electronic device are reduced. Especially when the above keys are physical keys, after various functions are integrated in the first key, the purpose of reducing the number of keys in the electronic device can be more effectively achieved. Therefore, in the process of manufacturing the electronic device which performs the touch method according to the embodiment of the present disclosure, a number of implementing punching processes on the electronic device is reduced, thereby reducing a number of holes in the body of the electronic device. Thus, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, thereby improving the user experience.

Fifteenth Embodiment

The present embodiment is based on the method according to the twelfth embodiment or the fourteenth embodiment. In the present embodiment, the method further comprises: determining, according to the first data information, a first displacement formed by the second operation on the first key, and a first speed of the second operation relative to the first key; and judging whether the first displacement and the first speed satisfy a first preset rule to acquire a first judgment result. Correspondingly, adjusting the first functional parameter in a second adjustment mode comprises adjusting, according to the first judgment result, the first functional parameter in the second adjustment mode.

In the present embodiment, the electronic device may determine the adjustment mode and/or adjustment amplitude for adjusting the first functional parameter according to the first displacement formed by the second operation on the first key and the speed of the second operation relative to the first key.

Sixteenth Embodiment

The present embodiment is based on the method according to the fifteenth embodiment. In the present embodiment, adjusting, according to the first judgment result, the first functional parameter in the second adjustment mode comprises: adjusting, according to the first judgment result, the first functional parameter to a first value in the second adjustment mode within a preset period of time when the first judgment result indicates that the first displacement and the first speed satisfy the first preset rule.

In a specific embodiment, when the first displacement is greater than or equal to a first time threshold in the first preset rule and the first speed is greater than or equal to a first speed threshold in the first preset rule, the electronic device reduces the first functional parameter to a first value within the preset period of time, for example, reduces the volume of the electronic device to 0 within the preset period of time.

Seventeenth Embodiment

The present embodiment is based on the method according to the eleventh embodiment or the thirteenth embodiment. In the present embodiment, the method further comprises: determining, according to the first data information, a second displacement formed by the second operation on the first key; and determining a first adjustment amplitude corresponding to the second displacement. Correspondingly, adjusting the first functional parameter in a first adjustment mode comprises adjusting the first functional parameter with the first adjustment amplitude in the first adjustment mode.

In the present embodiment, the electronic device may determine the adjustment mode and/or adjustment amplitude for adjusting the first functional parameter according to the second displacement formed by the second operation on the first key.

Eighteenth Embodiment

Figure 16:
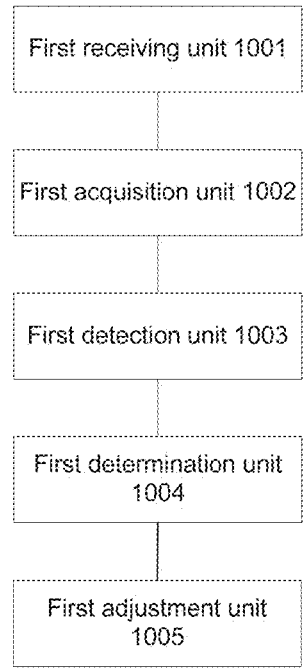
FIG. 16 is a first functional block diagram of an electronic device according to an embodiment of the present disclosure.

FIG. 16 is a first functional block diagram of an electronic device according to an embodiment of the present disclosure. The electronic device comprises a first key arranged in a first position of the electronic device. The first key can enable, in response to a first operation, the electronic device to generate a first executable instruction based on the first operation. The first key is a physical key or a virtual key which can enable the electronic device to perform the first executable instruction based on the first operation. As shown in FIG. 16, the electronic device further comprises: a first receiving unit 1001 configured to receive a second operation via the first key when the electronic device displays a first interface of a first application program; a first acquisition unit 1002 configured to acquire first data information corresponding to the second operation, the first data information representing data information corresponding to movement parameters of the second operation; a first detection unit 1003 configured to detect current first posture information of the electronic device; a first determination unit 1004 configured to acquire a first result based on the first data information and the first posture information; and a first adjustment unit 1005 configured to adjust, according to the first result, a first functional parameter of the electronic device, so that the adjusted first functional parameter corresponds to the first judgment result.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which implement the functions according to the embodiment of the present disclosure, or may also be achieved by executing software which implements the functions according to the embodiment of the present disclosure on an intelligent terminal.

Nineteenth Embodiment

The electronic device according to the present embodiment is based on the electronic device according to the eighteenth embodiment. In the present embodiment, the first adjustment unit is further configured to adjust the first functional parameter in a first adjustment mode when the first result indicates that a movement direction in the movement parameters of the second operation which are represented by the first data information is a first preset direction relative to the electronic device, wherein the electronic device is an electronic device in a posture represented by the first posture information.

In the present embodiment, the first adjustment unit is further configured to adjust the first functional parameter in a first adjustment mode when the first result indicates that the movement direction in the movement parameters of the second operation which are represented by the first data information is a first direction, and the electronic device is in a first posture represented by the first posture information (in this case, the first direction relative to the electronic device in the first posture is determined as the first preset direction).

In the present embodiment, the first adjustment unit is further configured to adjust the first functional parameter in a second adjustment mode when the first result indicates that the movement direction in the movement parameters of the second operation which are represented by the first data information is a second preset direction relative to the electronic device, wherein the electronic device is an electronic device in a posture represented by the first posture information.

In the present embodiment, the first adjustment unit is further configured to adjust the first functional parameter in a second adjustment mode when the first result indicates that the movement direction in the movement parameters of the second operation which are represented by the first data information is a second direction, and the electronic device is in a first posture represented by the first posture information (in this case, the second direction relative to the electronic device in the first posture is determined as the second preset direction).

In the present embodiment, the first adjustment unit is further configured to adjust the first functional parameter in the first adjustment mode when the first result indicates that the movement direction in the movement parameters of the second operation which are represented by the first data information is a third preset direction relative to the electronic device, wherein the electronic device is an electronic device in a posture represented by the first posture information.

In the present embodiment, the first adjustment unit is further configured to adjust the first functional parameter in the first adjustment mode when the first result indicates that the movement direction in the movement parameters of the second operation which are represented by the first data information is a third direction, and the electronic device is in a second posture represented by the first posture information (in this case, the third direction relative to the electronic device in the second posture is determined as the third preset direction).

In the present embodiment, the first adjustment unit is further configured to adjust the first functional parameter in the second adjustment mode when the first result indicates that the movement direction in the movement parameters of the second operation which are represented by the first data information is a fourth preset direction relative to the electronic device, wherein the electronic device is an electronic device in a posture represented by the first posture information.

In the present embodiment, the first adjustment unit is further configured to adjust the first functional parameter in the second adjustment mode when the first result indicates that the movement direction in the movement parameters of the second operation which are represented by the first data information is a fourth direction, and the electronic device is in a second posture represented by the first posture information (in this case, the fourth direction relative to the electronic device in the second posture is determined as the fourth preset direction).

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which implement the functions according to the embodiment of the present disclosure, or may also be achieved by executing software which implements the functions according to the embodiment of the present disclosure on an intelligent terminal.

Twentieth Embodiment

Figure 17:
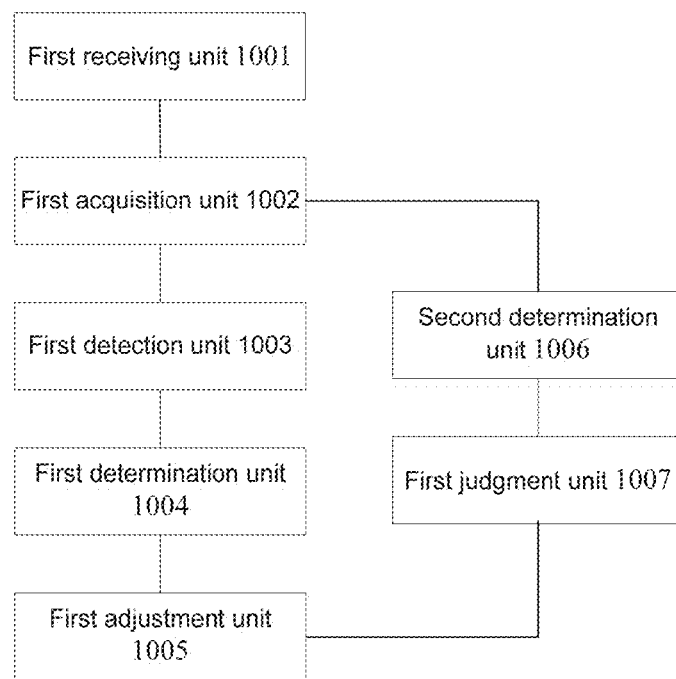
FIG. 17 is a second functional block diagram of an electronic device according to an embodiment of the present disclosure.

The electronic device according to the present embodiment is based on the electronic device according to the nineteenth embodiment. In the present embodiment, as shown in FIG. 17, the electronic device further comprises: a second determination unit 1006 configured to determine, according to the first data information, a first displacement formed by the second operation on the first key, and a first speed of the second operation relative to the first key; and a first judgment unit 1007 configured to judge whether the first displacement and the first speed satisfy a first preset rule to acquire a first judgment result.

Correspondingly, the first adjustment unit 1005 is further configured to adjust, according to the first judgment result, the first functional parameter in the second adjustment mode.

In the above solution, the first adjustment unit is further configured to adjust, according to the first judgment result, the first functional parameter to a first value in the second adjustment mode within a preset period of time when the first judgment result indicates that the first displacement and the first speed satisfy the first preset rule.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which implement the functions according to the embodiment of the present disclosure, or may also be achieved by executing software which implements the functions according to the embodiment of the present disclosure on an intelligent terminal.

Twenty-first Embodiment

Figure 18:
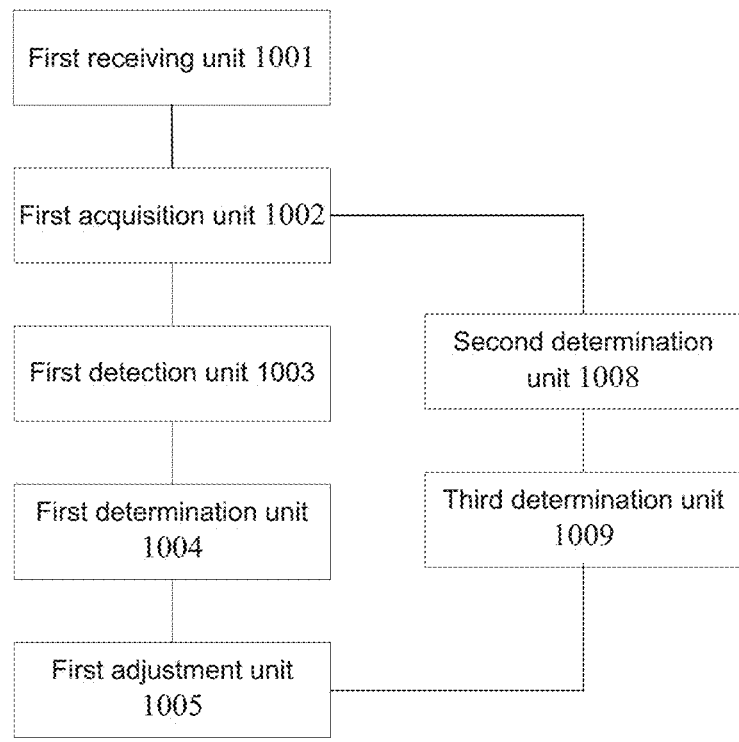
FIG. 18 is a third functional block diagram of an electronic device according to an embodiment of the present disclosure.

The electronic device according to the present embodiment is based on the electronic device according to the nineteenth embodiment. In the present embodiment, as shown in FIG. 18, the electronic device further comprises a second determination unit 1008 configured to determine, according to the first data information, a second displacement formed by the second operation on the first key; and a third determination unit 1009 configured to determine a first adjustment amplitude corresponding to the second displacement.

Correspondingly, the first adjustment unit 1005 is further configured to adjust the first functional parameter with the first adjustment amplitude in the first adjustment mode.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which implement the functions according to the embodiment of the present disclosure, or may also be achieved by executing software which implements the functions according to the embodiment of the present disclosure on an intelligent terminal.

Twenty-second Embodiment

Figure 19:
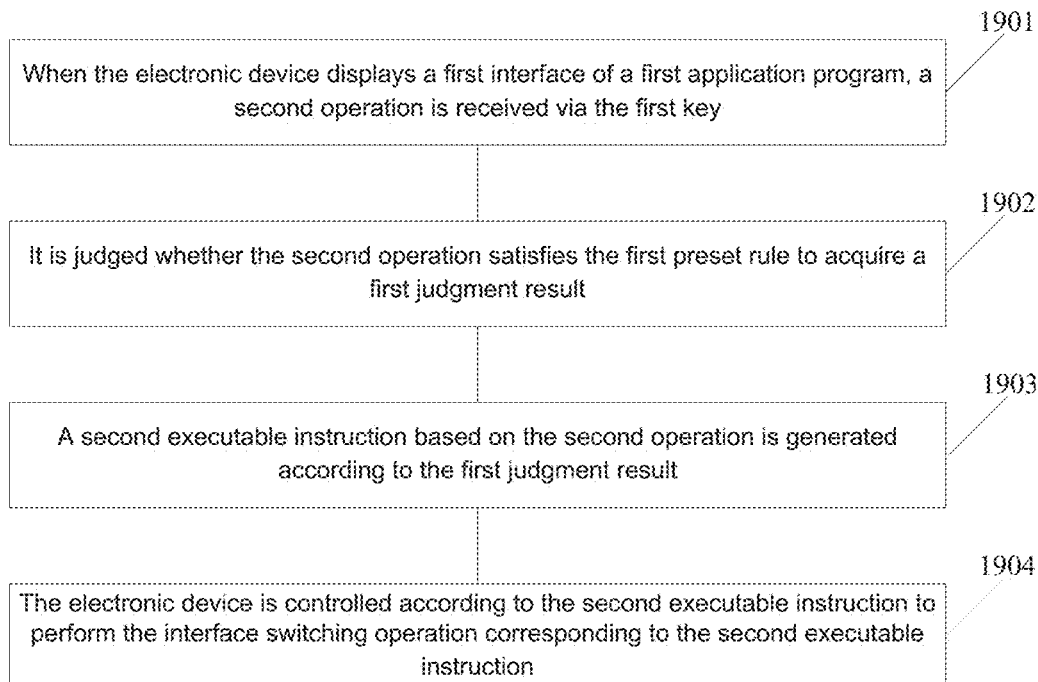
FIG. 19 is a sixth flowchart of implementing a touch method according to an embodiment of the present disclosure.

FIG. 19 is a sixth flowchart of implementing a touch method according to an embodiment of the present disclosure. The method is applied in an electronic device comprising a first key arranged in a first position thereof. The first key can enable, in response to a first operation, the electronic device to generate a first executable instruction based on the first operation, so as to instruct the electronic device to display a first main interface through the first executable instruction. The first key is a physical key or a virtual key which can enable the electronic device to perform the first executable instruction based on the first operation.

As shown in FIG. 19, the method comprises step S1901. In step S1901, when the electronic device displays a first interface of a first application program, a second operation is received via the first key.

In the present embodiment, when the first key is a physical key, the first operation is a press operation relative to the first key. For example, the first operation is an operation of single clicking on the first key. Further, when the first operation satisfies a preset condition, the electronic device can generate a first executable instruction based on the first operation, so that the electronic device displays the first main interface in a display area thereof according to the first executable instruction. That is, the first key in the present embodiment may specifically be a home key, i.e., the first key has a home function. Here, other home functions of the first key are the same as the home functions in the related art, and will not be described here in detail.

In the present embodiment, when the first key is a virtual key, the first operation is a touch operation relative to the first key. For example, the first operation is a touch operation of an operating body relative to the first key. Further, as the first key is a virtual key, that is, the first key is necessarily operable to sense a touch operation, the first key has necessarily a touch sensing region arranged therein, i.e., a first touch sensing region. Thus, the electronic device can respond to the first operation via the first touch sensing region. Here, when the first operation satisfies the preset condition, the electronic device can generate a first executable instruction based on the first operation, so that the electronic device displays the first main interface in the display area thereof based on the first executable instruction. That is, the first key in the present embodiment may specifically be a home key, i.e., the first key has a home function. Here, other home functions of the first key are the same as the home functions in the related art, and will not be described here in detail.

It should be noted that the first interface in the present embodiment is an interface after a user starts a first application program, and therefore, the first interface is different from the first main interface. Further, when the electronic device receives a first operation via the first key, and the first operation satisfies a preset condition, the first key executes a function of returning to the first main interface in the home functions. That is, the electronic device generates a first executable instruction in response to the first operation, to display the first main interface in the display area thereof. Thus, the home function of the first key is achieved.

In the present embodiment, the preset condition may represent an operation with a pressure value generated when an operating body corresponding to the first operation presses on or touch the first key being greater than a pressure threshold; or the preset condition may represent an operation of an operating body corresponding to the first operation double clicking on the first key.

In the present embodiment, the first key in the electronic device not only has the home function but also has a back function. Further, when the electronic device displays a first interface of the first application program, a second operation is received via the first key. When the second operation satisfies the first preset rule, the first key in the electronic device executes the back function.

In the present embodiment, the electronic device may be an intelligent electronic device such as a mobile phone, a tablet computer or the like. The first interface may be a graphic interactive interface or a display interface corresponding to the first application program. The first application program is any application program which can be supported by the electronic device, for example, any program installed in the electronic device.

In step 1902, it is judged whether the second operation satisfies the first preset rule to acquire a first judgment result.

In the present embodiment, when the electronic device receives the second operation via the first key, the electronic device needs to judge whether the second operation satisfies the first preset rule, so as to determine whether the electronic device is to execute a home function or a back function, or shield the second operation.

In practical applications, the first preset rule may be randomly set according to practical requirements, for example, factors such as technical implementations, user operations or the like.

For example, in a specific embodiment, the first preset rule may be a first pressure rule. Specifically, judging whether the second operation satisfies a first preset rule comprises judging whether the second operation satisfies the first pressure rule. Further, it is judged whether a pressure value generated by an operating body corresponding to the second operation pressing on or touching the first key is less than or equal to a pressure threshold in the first pressure rule. When the pressure value generated by an operating body corresponding to the second operation pressing on or touching the first key is less than or equal to the pressure threshold in the first pressure rule, the first key executes a back function. When the pressure value generated by an operating body corresponding to the second operation pressing on or touching the first key is greater than the pressure threshold in the first pressure rule, the second operation is a similar to the first operation, and therefore the first key executes a home function. Thus, with the above process, the purpose of achieving the first key having both a home function and a back function is achieved. Here, the first key may be arranged with a pressure sensor to implement the above process.

In another specific embodiment, the first preset rule may be a first number rule. Specifically, judging whether the second operation satisfies a first preset rule comprises judging whether the second operation satisfies the first number rule. Further, it is judged whether a number of an operating body corresponding to the second operation pressing on or touching the first key satisfies the first number rule. When the number of an operating body corresponding to the second operation pressing on or touching the first key is equal to a first number threshold in the first number rule, i.e., the number of an operating body corresponding to the second operation pressing on or touching the first key satisfies the first number rule (for example, the first number threshold is 1, and the operating body corresponding to the second operation presses on or touches the first key once, i.e., the second operation is a single click operation relative to the first key), the first key executes a back function.

Further, when the number of the operating body corresponding to the second operation pressing on or touching the first key is equal to a second number threshold in the first number rule, i.e., the number of the operating body corresponding to the second operation pressing on or touching the first key satisfies the first number rule, it needs to further judge whether an interval between two operations of the operating body corresponding to the second operation pressing on or touching the first key is less than or equal to a first time threshold in the first number rule. In this way, the current executive function of the first key is determined. Specifically, when the second number threshold is 2, and the operating body corresponding to the second operation pressing on or touching the first key twice, it is judged whether the interval between two operations of the operating body corresponding to the second operation pressing on or touching the first key is less than or equal to the first time threshold in the first number rule. Further, when the interval between two operations of the operating body corresponding to the second operation pressing on or touching the first key is less than or equal to the first time threshold in the first number rule, i.e., the second operation is an operation of double clicking on the first key, the first key executes a home function.

It should be noted that the specific embodiments described above are merely used to explain the embodiments of the present disclosure, instead of limiting the embodiments of the present disclosure. In practical applications, a preset rule may be set randomly according to practical requirements, and the stands for judging whether the first key is to execute a home function or a back function may also be set randomly according to practical requirements.

In step 1903, a second executable instruction based on the second operation is generated according to the first judgment result.

Specifically, as the executive body of the touch method according to the present embodiment is the electronic device, step 1903 may further comprise generating, according to the first judgment result, the second executable instruction corresponding to the second operation. Further, the electronic device controls, according to the second executable instruction, the electronic device to execute an interface switching operation corresponding to the second executable instruction.

In step 1904, the electronic device is controlled according to the second executable instruction to execute the interface switching operation corresponding to the second executable instruction.

In the above solution, the first key further has a back function, i.e., the first key may further be a back key. Thus, a corresponding operation of the first key may be responded so that the display area of the electronic device returns from the current display interface to an upper-level display interface. Specifically, controlling, according to the second executable instruction, the electronic device to execute the interface switching operation corresponding to the second executable instruction comprises controlling, according to the second executable instruction, the electronic device to exit the first interface or the first application program corresponding to the first interface, so that the electronic device returns to an upper-level interface corresponding to the current first interface; or instructing, according to the second executable instruction, to display the first main interface.

In a preferable embodiment, as the first key has both the home function and the back function, the surface of body of the electronic device which performs the touch method may only have the first key.

The first key in the touch method according to the embodiment of the present disclosure firstly has a home function. That is, the first key can respond to the first operation, and generate a first executable instruction based on the first operation, so that the electronic device displays, according to the first executable instruction, a preset first main interface in the display area thereof. Secondly, the first key further has a back function. That is, the first key can respond to the second operation, and generate a second executable instruction based on the second operation, so that the electronic device performs an interface switching operation according to the second executable instruction. Therefore, the touch method according to the embodiment of the present disclosure can integrate the home function and the back function in the same key, i.e., the first key. Thus, a user of the electronic device can perform different application functions only by performing different touch operations or the same touch operation on the first key. In this way, the touch method according to the present embodiment can ensure that all operations are uniformly performed on the first key as much as possible, thereby improving user experience.

In addition, when the first key is a physical key, as the first key has both a home function and a back function, the electronic device which performs the touch method according to the embodiment of the present disclosure needs not to be individually arranged with a key having a back function. Thus, compared with the existing electronic devices having many physical keys, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, and achieves indistinctive operating experience, thereby further improving the user experience.

Twenty-third Embodiment

Figure 20:
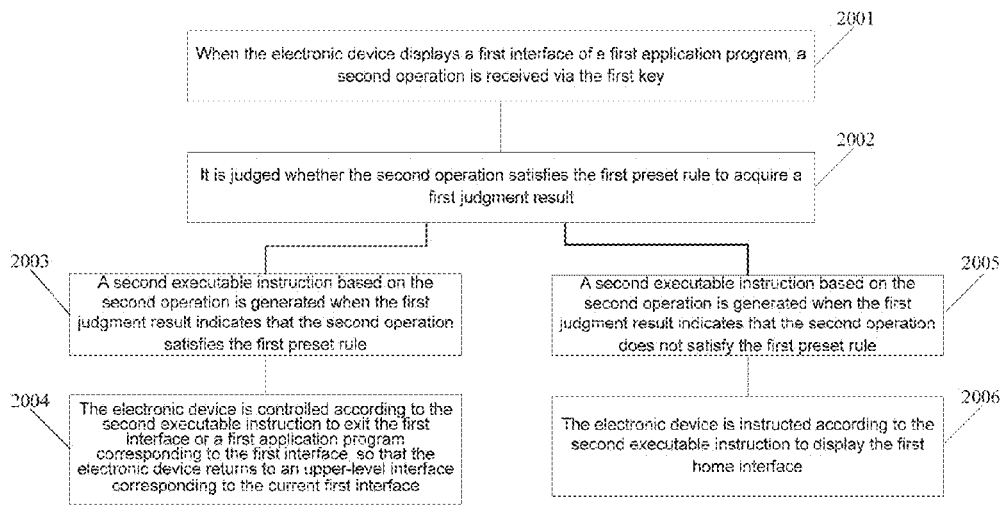
FIG. 20 is a seventh flowchart of implementing a touch method according to an embodiment of the present disclosure.

FIG. 20 is a seventh flowchart of implementing a touch method according to an embodiment of the present disclosure. The method is applied in an electronic device comprising a first key arranged in a first position thereof. The first key can enable, in response to a first operation, the electronic device to generate a first executable instruction based on the first operation, so as to instruct the electronic device to display a first main interface through the first executable instruction. The first key is a physical key or a virtual key which can enable the electronic device to perform the first executable instruction based on the first operation.

As shown in FIG. 20, the method comprises step 2001. In step S2001, when the electronic device displays a first interface of a first application program, a second operation is received via the first key.

In the present embodiment, when the first key is a physical key, the first operation is a press operation relative to the first key. For example, the first operation is an operation of single clicking on the first key. Further, when the first operation satisfies a preset condition, the electronic device can generate a first executable instruction based on the first operation, so that the electronic device displays the first main interface in a display area thereof according to the first executable instruction. That is, the first key in the present embodiment may specifically be a home key, i.e., the first key has a home function. Here, other home functions of the first key are the same as the home functions in the related art, and will not be described here in detail.

In the present embodiment, when the first key is a virtual key, the first operation is a touch operation relative to the first key. For example, the first operation is a touch operation of an operating body relative to the first key. Further, as the first key is a virtual key, that is, the first key is necessarily operable to sense a touch operation, the first key has necessarily a touch sensing region arranged therein, i.e., a first touch sensing region. Thus, the electronic device can respond to the first operation via the first touch sensing region. Here, when the first operation satisfies the preset condition, the electronic device can generate a first executable instruction based on the first operation, so that the electronic device displays the first main interface in the display area thereof based on the first executable instruction. That is, the first key in the present embodiment may specifically be a home key, i.e., the first key has a home function. Here, other home functions of the first key are the same as the home functions in the related art, and will not be described here in detail.

It should be noted that the first interface in the present embodiment is an interface after a user starts a first application program, and therefore, the first interface is different from the first main interface. Further, when the electronic device receives a first operation via the first key, and the first operation satisfies a preset condition, the first key executes a function of returning to the first main interface in the home functions. That is, the electronic device generates a first executable instruction in response to the first operation, to display the first main interface in the display area thereof. Thus, the home function of the first key is achieved.

In the present embodiment, the preset condition may represent an operation with a pressure value generated when an operating body corresponding to the first operation presses on or touch the first key being greater than a pressure threshold; or the preset condition may represent an operation of an operating body corresponding to the first operation double clicking on the first key.

In the present embodiment, the first key in the electronic device not only has the home function but also has a back function. Further, when the electronic device displays a first interface of the first application program, a second operation is received via the first key. When the second operation satisfies the first preset rule, the first key in the electronic device executes the back function.

In the present embodiment, the electronic device may be an intelligent electronic device such as a mobile phone, a tablet computer or the like. The first interface may be a graphic interactive interface or a display interface corresponding to the first application program. The first application program is any application program which can be supported by the electronic device, for example, any program installed in the electronic device.

In step 2002, it is judged whether the second operation satisfies the first preset rule to acquire a first judgment result.

In the present embodiment, when the electronic device receives the second operation via the first key, the electronic device needs to judge whether the second operation satisfies the first preset rule, so as to determine whether the electronic device is to execute a home function or a back function, or shield the second operation.

In practical applications, the first preset rule may be randomly set according to practical requirements, for example, factors such as technical implementations, user operations or the like.

For example, in a specific embodiment, the first preset rule may be a first pressure rule. Specifically, judging whether the second operation satisfies a first preset rule comprises judging whether the second operation satisfies the first pressure rule. Further, it is judged whether a pressure value generated by an operating body corresponding to the second operation pressing on or touching the first key is less than or equal to a pressure threshold in the first pressure rule. When the pressure value generated by an operating body corresponding to the second operation pressing on or touching the first key is less than or equal to the pressure threshold in the first pressure rule, the first key executes a back function. That is, the electronic device generates a second executable instruction based on the second operation, so that the electronic device exits the first application or a first application program corresponding to the first interface according to the second executable instruction, so as to return to an upper-level display interface corresponding to the first display interface. When the pressure value generated by an operating body corresponding to the second operation pressing on or touching the first key is greater than the pressure threshold in the first pressure rule, the second operation is a similar to the first operation, and therefore the first key executes a home function. That is, the electronic device generates a second executable instruction based on the second operation, so that the electronic device displays a first main interface in a display area thereof according to the second executable instruction. Thus, with the above process, the purpose of achieving the first key having both a home function and a back function is achieved. Here, the first key may be arranged with a pressure sensor to implement the above process.

In another specific embodiment, the first preset rule may be a first number rule. Specifically, judging whether the second operation satisfies a first preset rule comprises judging whether the second operation satisfies the first number rule. Further, it is judged whether a number of an operating body corresponding to the second operation pressing on or touching the first key satisfies the first number rule. When the number of an operating body corresponding to the second operation pressing on or touching the first key is equal to a first number threshold in the first number rule, i.e., the number of an operating body corresponding to the second operation pressing on or touching the first key satisfies the first number rule (for example, the first number threshold is 1, and the operating body corresponding to the second operation presses on or touches the first key once, i.e., the second operation is a single click operation relative to the first key), the first key executes a back function. That is, the electronic device is controlled according to the second executable instruction to exit the first interface or a first application program corresponding to the first interface, so that the electronic device returns to an upper-level interface corresponding to the current first interface.

Further, when the number of the operating body corresponding to the second operation pressing on or touching the first key is equal to a second number threshold in the first number rule, i.e., the number of the operating body corresponding to the second operation pressing on or touching the first key satisfies the first number rule, it needs to further judge whether an interval between two operations of the operating body corresponding to the second operation pressing on or touching the first key is less than or equal to a first time threshold in the first number rule. In this way, the current executive function of the first key is determined. Specifically, when the second number threshold is 2, and the operating body corresponding to the second operation pressing on or touching the first key twice, it is judged whether the interval between two operations of the operating body corresponding to the second operation pressing on or touching the first key is less than or equal to the first time threshold in the first number rule. Further, when the interval between two operations of the operating body corresponding to the second operation pressing on or touching the first key is less than or equal to the first time threshold in the first number rule, i.e., the second operation is an operation of double clicking on the first key, the first key executes a home function. That is, the electronic device is instructed according to the second executable instruction to display the first main interface.

It should be noted that the specific embodiments described above are merely used to explain the embodiments of the present disclosure, instead of limiting the embodiments of the present disclosure. In practical applications, a preset rule may be set randomly according to practical requirements, and the stands for judging whether the first key is to execute a home function or a back function may also be set randomly according to practical requirements.

In step 2003, a second executable instruction based on the second operation is generated when the first judgment result indicates that the second operation satisfies the first preset rule. Then, step 2004 is performed.

In step 2004, the electronic device is controlled according to the second executable instruction to exit the first interface or a first application program corresponding to the first interface, so that the electronic device returns to an upper-level interface corresponding to the current first interface.

In step 2005, a second executable instruction based on the second operation is generated when the first judgment result indicates that the second operation does not satisfy the first preset rule. Then, step 2006 is performed.

Specifically, when the first judgment result indicates that the second operation does not satisfy the first preset rule but satisfies the preset condition, the second operation is similar to the first operation. Therefore, the first key performs a home function, i.e., the electronic device displays the first main interface in the display area thereof according to the second executable instruction.

Further, when the second operation neither satisfies the first preset rule nor satisfies the preset condition, the electronic device shields the second operation.

In step 2006, the electronic device is instructed according to the second executable instruction to display the first main interface.

In a preferable embodiment, as the first key has both the home function and the back function, the surface of body of the electronic device which performs the touch method may only have the first key.

The first key in the touch method according to the embodiment of the present disclosure firstly has a home function. That is, the first key can respond to the first operation, and generate a first executable instruction based on the first operation, so that the electronic device displays, according to the first executable instruction, a preset first main interface in the display area thereof. Secondly, the first key further has a back function. That is, the first key can respond to the second operation, and generate a second executable instruction based on the second operation, so that the electronic device performs an interface switching operation according to the second executable instruction. Therefore, the touch method according to the embodiment of the present disclosure can integrate the home function and the back function in the same key, i.e., the first key. Thus, a user of the electronic device can perform different application functions only by performing different touch operations or the same touch operation on the first key. In this way, the touch method according to the present embodiment can ensure that all operations are uniformly performed on the first key as much as possible, thereby improving user experience.

In addition, when the first key is a physical key, as the first key has both a home function and a back function, the electronic device which performs the touch method according to the embodiment of the present disclosure needs not to be individually arranged with a key having a back function. Thus, compared with the existing electronic devices having many physical keys, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, and achieves indistinctive operating experience, thereby further improving the user experience.

Twenty-fourth Embodiment

Figure 21:
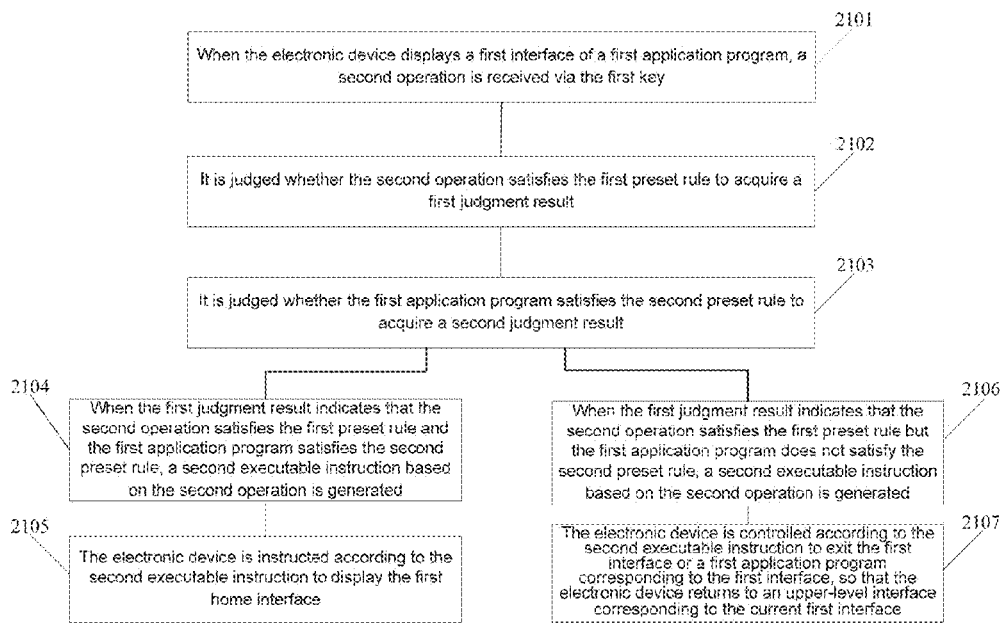
FIG. 21 is an eighth flowchart of implementing a touch method according to an embodiment of the present disclosure.

FIG. 21 is an eighth flowchart of implementing a touch method according to an embodiment of the present disclosure. The method is applied in an electronic device comprising a first key arranged in a first position thereof. The first key can enable, in response to a first operation, the electronic device to generate a first executable instruction based on the first operation, so as to instruct the electronic device to display a first main interface through the first executable instruction. The first key is a physical key or a virtual key which can enable the electronic device to perform the first executable instruction based on the first operation.

As shown in FIG. 21, the method comprises step 2101. In step S2101, when the electronic device displays a first interface of a first application program, a second operation is received via the first key.

In the present embodiment, when the first key is a physical key, the first operation is a press operation relative to the first key. For example, the first operation is an operation of single clicking on the first key. Further, when the first operation satisfies a preset condition, the electronic device can generate a first executable instruction based on the first operation, so that the electronic device displays the first main interface in a display area thereof according to the first executable instruction. That is, the first key in the present embodiment may specifically be a home key, i.e., the first key has a home function. Here, other home functions of the first key are the same as the home functions in the related art, and will not be described here in detail.

In the present embodiment, when the first key is a virtual key, the first operation is a touch operation relative to the first key. For example, the first operation is a touch operation of an operating body relative to the first key. Further, as the first key is a virtual key, that is, the first key is necessarily operable to sense a touch operation, the first key has necessarily a touch sensing region arranged therein, i.e., a first touch sensing region. Thus, the electronic device can respond to the first operation via the first touch sensing region. Here, when the first operation satisfies the preset condition, the electronic device can generate a first executable instruction based on the first operation, so that the electronic device displays the first main interface in the display area thereof based on the first executable instruction. That is, the first key in the present embodiment may specifically be a home key, i.e., the first key has a home function. Here, other home functions of the first key are the same as the home functions in the related art, and will not be described here in detail.

It should be noted that the first interface in the present embodiment is an interface after a user starts a first application program, and therefore, the first interface is different from the first main interface. Further, when the electronic device receives a first operation via the first key, and the first operation satisfies a preset condition, the first key executes a function of returning to the first main interface in the home functions. That is, the electronic device generates a first executable instruction in response to the first operation, to display the first main interface in the display area thereof. Thus, the home function of the first key is achieved.

In the present embodiment, the preset condition may represent an operation with a pressure value generated when an operating body corresponding to the first operation presses on or touch the first key being greater than a pressure threshold; or the preset condition may represent an operation of an operating body corresponding to the first operation double clicking on the first key.

In the present embodiment, the first key in the electronic device not only has the home function but also has a back function. Further, when the electronic device displays a first interface of the first application program, a second operation is received via the first key. When the second operation satisfies the first preset rule, the first key in the electronic device executes the back function.

In the present embodiment, the electronic device may also be an intelligent electronic device such as a mobile phone, a tablet computer or the like. The first interface may be a graphic interactive interface or a display interface corresponding to the first application program. The first application program is any application program which can be supported by the electronic device, for example, any program installed in the electronic device.

In step 2102, it is judged whether the second operation satisfies the first preset rule to acquire a first judgment result.

In the present embodiment, when the electronic device receives the second operation via the first key, the electronic device not only needs to judge whether the second operation satisfies the first preset rule, but also needs to judge whether the first application program executed by the electronic device satisfies a second preset rule, so as to determine whether the electronic device is to execute a home function or a back function, or shield the second operation.

In practical applications, the first preset rule may be randomly set according to practical requirements, for example, factors such as technical implementations, user operations or the like.

For example, in a specific embodiment, the first preset rule may be a first pressure rule. Specifically, judging whether the second operation satisfies a first preset rule comprises judging whether the second operation satisfies the first pressure rule. Further, it is judged whether a pressure value generated by an operating body corresponding to the second operation pressing on or touching the first key is less than or equal to a pressure threshold in the first pressure rule. When the pressure value generated by an operating body corresponding to the second operation pressing on or touching the first key is less than or equal to the pressure threshold in the first pressure rule, the second operation satisfies the first preset rule. When the pressure value generated by an operating body corresponding to the second operation pressing on or touching the first key is greater than the pressure threshold in the first pressure rule, the second operation does not satisfy the first preset rule. Here, the first key may be arranged with a pressure sensor to implement the above process.

In another specific embodiment, the first preset rule may be a first number rule. Specifically, judging whether the second operation satisfies a first preset rule comprises judging whether the second operation satisfies the first number rule. Further, it is judged whether a number of an operating body corresponding to the second operation pressing on or touching the first key satisfies the first number rule. When the number of an operating body corresponding to the second operation pressing on or touching the first key is equal to a first number threshold in the first number rule, i.e., the number of an operating body corresponding to the second operation pressing on or touching the first key satisfies the first number rule (for example, the first number threshold is 1, and the operating body corresponding to the second operation presses on or touches the first key once, i.e., the second operation is a single click operation relative to the first key), the second operation satisfies the first preset rule.

Further, when the number of the operating body corresponding to the second operation pressing on or touching the first key is equal to a second number threshold in the first number rule, i.e., the number of the operating body corresponding to the second operation pressing on or touching the first key satisfies the first number rule, it needs to further judge whether an interval between two operations of the operating body corresponding to the second operation pressing on or touching the first key is less than or equal to a first time threshold in the first number rule. In this way, the current executive function of the first key is determined. Specifically, when the second number threshold is 2, and the operating body corresponding to the second operation pressing on or touching the first key twice, it is judged whether the interval between two operations of the operating body corresponding to the second operation pressing on or touching the first key is less than or equal to the first time threshold in the first number rule. Further, when the interval between two operations of the operating body corresponding to the second operation pressing on or touching the first key is less than or equal to the first time threshold in the first number rule, i.e., the second operation is an operation of double clicking on the first key, the second operation satisfies the first preset rule.

It should be noted that the specific embodiments described above are merely used to explain the embodiments of the present disclosure, instead of limiting the embodiments of the present disclosure. In practical applications, a preset rule may be set randomly according to practical requirements.

In step 2103, it is judged whether the first application program satisfies the second preset rule to acquire a second judgment result.

It should be noted here that the order in which the steps 2102 and 2103 are performed can be changed, or steps 2102 and 2103 are performed at the same time.

Further, in order to define the function of the first key in a particular application scenario, in the embodiment of the present disclosure, it also needs to judge whether the first application program satisfies the second preset rule. Thus, the first key only has a home function in the particular application scenario.

In step 2104, when the first judgment result indicates that the second operation satisfies the first preset rule and the first application program satisfies the second preset rule, a second executable instruction based on the second operation is generated. Then, step 2105 is performed.

In step 2105, the electronic device is instructed according to the second executable instruction to display the first main interface.

In the present embodiment, when the first application program satisfies the second preset rule, even if the second operation satisfies the first preset rule, the first key only executes the home function.

Specifically, the first application program may be a program corresponding to an application such as a notification center, a control center or the like. In this case, even if the second operation satisfies the first preset rule, the first key only executes the home function, i.e., the function of instructing the electronic device to display the first main interface.

In step 2106, when the first judgment result indicates that the second operation satisfies the first preset rule but the first application program does not satisfy the second preset rule, a second executable instruction based on the second operation is generated. Then, step 2107 is performed.

In step 2107, the electronic device is controlled according to the second executable instruction to exit the first interface or a first application program corresponding to the first interface, so that the electronic device returns to an upper-level interface corresponding to the current first interface.

In the present embodiment, when the first application program does not satisfy the second preset rule, if the second operation satisfies the first preset rule, the first key executes a back function. That is, the electronic device generates a second executable instruction in response to the second operation, to exit the first interface or a first application program corresponding to the first interface, so that the electronic device returns to an upper-level interface corresponding to the current first interface.

Thus, the touch method according to the embodiment of the present disclosure can define the function of the first key in a particular application program, which is convenient to operate by a user in a particular application scenario, thereby improving the user experience.

Further, in the touch method according to the present embodiment, when the first application program satisfies the second preset rule, the first key only has a home function; and when the first application program does not satisfy the second preset rule, the first key has both a home function and a back function. Thus, in a particular application scenario, the electronic device can return to the first main interface in a rapid manner, thereby improving the user experience.

Further, in a preferable embodiment, as the first key has both the home function and the back function, the surface of body of the electronic device which performs the touch method may only have the first key.

The first key in the touch method according to the embodiment of the present disclosure firstly has a home function. That is, the first key can respond to the first operation, and generate a first executable instruction based on the first operation, so that the electronic device displays, according to the first executable instruction, a preset first main interface in the display area thereof. Secondly, the first key further has a back function. That is, the first key can respond to the second operation, and generate a second executable instruction based on the second operation, so that the electronic device performs an interface switching operation according to the second executable instruction. Therefore, the touch method according to the embodiment of the present disclosure can integrate the home function and the back function in the same key, i.e., the first key. Thus, a user of the electronic device can perform different application functions only by performing different touch operations or the same touch operation on the first key. In this way, the touch method according to the present embodiment can ensure that all operations are uniformly performed on the first key as much as possible, thereby improving user experience.

In addition, when the first key is a physical key, as the first key has both a home function and a back function, the electronic device which performs the touch method according to the embodiment of the present disclosure needs not to be individually arranged with a key having a back function. Thus, compared with the existing electronic devices having many physical keys, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, and achieves indistinctive operating experience, thereby further improving the user experience.

Twenty-fifth Embodiment

A touch method is provided according to an embodiment of the present disclosure. The method is applied in an electronic device comprising a first key and a second key. The first key is arranged in a first position of the electronic device, and the second key is arranged in a second position of the electronic device. The first key can enable, in response to a first operation, the electronic device to generate a first executable instruction based on the first operation, so as to instruct the electronic device to display a first main interface through the first executable instruction. The first key is a physical key or a virtual key which can enable the electronic device to perform the first executable instruction based on the first operation. The second key is a physical key which can adjust a first functional parameter of the electronic device.

The method comprises step 2201. In step S2201, when the electronic device displays a first interface of a first application program, a second operation is received via the first key.

In the present embodiment, when the first key is a physical key, the first operation is a press operation relative to the first key. For example, the first operation is an operation of single clicking on the first key. Further, when the first operation satisfies a preset condition, the electronic device can generate a first executable instruction based on the first operation, so that the electronic device displays the first main interface in a display area thereof according to the first executable instruction. That is, the first key in the present embodiment may specifically be a home key, i.e., the first key has a home function. Here, other home functions of the first key are the same as the home functions in the related art, and will not be described here in detail.

In the present embodiment, when the first key is a virtual key, the first operation is a touch operation relative to the first key. For example, the first operation is a touch operation of an operating body relative to the first key. Further, as the first key is a virtual key, that is, the first key is necessarily operable to sense a touch operation, the first key has necessarily a touch sensing region arranged therein, i.e., a first touch sensing region. Thus, the electronic device can respond to the first operation via the first touch sensing region. Here, when the first operation satisfies the preset condition, the electronic device can generate a first executable instruction based on the first operation, so that the electronic device displays the first main interface in the display area thereof based on the first executable instruction. That is, the first key in the present embodiment may specifically be a home key, i.e., the first key has a home function. Here, other home functions of the first key are the same as the home functions in the related art, and will not be described here in detail.

It should be noted that the first interface in the present embodiment is an interface after a user starts a first application program, and therefore, the first interface is different from the first main interface. Further, when the electronic device receives a first operation via the first key, and the first operation satisfies a preset condition, the first key executes a function of returning to the first main interface in the home functions. That is, the electronic device generates a first executable instruction in response to the first operation, to display the first main interface in the display area thereof. Thus, the home function of the first key is achieved.

In the present embodiment, the preset condition may represent an operation with a pressure value generated when an operating body corresponding to the first operation presses on or touch the first key being greater than a pressure threshold; or the preset condition may represent an operation of an operating body corresponding to the first operation double clicking on the first key.

In the present embodiment, the first key in the electronic device not only has the home function but also has a back function. Further, when the electronic device displays a first interface of the first application program, a second operation is received via the first key. When the second operation satisfies the first preset rule, the first key in the electronic device executes the back function.

In the present embodiment, the electronic device may also be an intelligent electronic device such as a mobile phone, a tablet computer or the like. The first interface may be a graphic interactive interface or a display interface corresponding to the first application program. The first application program is any application program which can be supported by the electronic device, for example, any program installed in the electronic device.

In the present embodiment, the second key is a key which can adjust functional parameters corresponding to the volume of the electronic device.

In step 2202, it is judged whether the second operation satisfies the first preset rule to acquire a first judgment result.

In the present embodiment, when the electronic device receives the second operation via the first key, the electronic device needs to judge whether the second operation satisfies the first preset rule, so as to determine whether the electronic device is to execute a home function or a back function, or shield the second operation.

In practical applications, the first preset rule may be randomly set according to practical requirements, for example, factors such as technical implementations, user operations or the like.

For example, in a specific embodiment, the first preset rule may be a first pressure rule. Specifically, judging whether the second operation satisfies a first preset rule comprises judging whether the second operation satisfies the first pressure rule. Further, it is judged whether a pressure value generated by an operating body corresponding to the second operation pressing on or touching the first key is less than or equal to a pressure threshold in the first pressure rule. When the pressure value generated by an operating body corresponding to the second operation pressing on or touching the first key is less than or equal to the pressure threshold in the first pressure rule, the first key executes a back function. That is, the electronic device generates a second executable instruction based on the second operation, so that the electronic device exits the first application or a first application program corresponding to the first interface according to the second executable instruction, so as to return to an upper-level display interface corresponding to the first display interface. When the pressure value generated by an operating body corresponding to the second operation pressing on or touching the first key is greater than the pressure threshold in the first pressure rule, the second operation is a similar to the first operation, and therefore the first key executes a home function. That is, the electronic device generates a second executable instruction based on the second operation, so that the electronic device displays a first main interface in a display area thereof according to the second executable instruction. Thus, with the above process, the purpose of achieving the first key having both a home function and a back function is achieved. Here, the first key may be arranged with a pressure sensor to implement the above process.

In another specific embodiment, the first preset rule may be a first number rule. Specifically, judging whether the second operation satisfies a first preset rule comprises judging whether the second operation satisfies the first number rule. Further, it is judged whether a number of an operating body corresponding to the second operation pressing on or touching the first key satisfies the first number rule. When the number of an operating body corresponding to the second operation pressing on or touching the first key is equal to a first number threshold in the first number rule, i.e., the number of an operating body corresponding to the second operation pressing on or touching the first key satisfies the first number rule (for example, the first number threshold is 1, and the operating body corresponding to the second operation presses on or touches the first key once, i.e., the second operation is a single click operation relative to the first key), the first key executes a back function. That is, the electronic device is controlled according to the second executable instruction to exit the first interface or a first application program corresponding to the first interface, so that the electronic device returns to an upper-level interface corresponding to the current first interface.

Further, when the number of the operating body corresponding to the second operation pressing on or touching the first key is equal to a second number threshold in the first number rule, i.e., the number of the operating body corresponding to the second operation pressing on or touching the first key satisfies the first number rule, it needs to further judge whether an interval between two operations of the operating body corresponding to the second operation pressing on or touching the first key is less than or equal to a first time threshold in the first number rule. In this way, the current executive function of the first key is determined. Specifically, when the second number threshold is 2, and the operating body corresponding to the second operation pressing on or touching the first key twice, it is judged whether the interval between two operations of the operating body corresponding to the second operation pressing on or touching the first key is less than or equal to the first time threshold in the first number rule. Further, when the interval between two operations of the operating body corresponding to the second operation pressing on or touching the first key is less than or equal to the first time threshold in the first number rule, i.e., the second operation is an operation of double clicking on the first key, the first key executes a home function. That is, the electronic device is instructed according to the second executable instruction to display the first main interface.

It should be noted that the specific embodiments described above are merely used to explain the embodiments of the present disclosure, instead of limiting the embodiments of the present disclosure. In practical applications, a preset rule may be set randomly according to practical requirements, and the stands for judging whether the first key is to execute a home function or a back function may also be set randomly according to practical requirements.

In step 2203, a second executable instruction based on the second operation is generated according to the first judgment result.

In step 2204, the electronic device is controlled according to the second executable instruction to execute an interface switching operation corresponding to the second executable instruction.

Specifically, a second executable instruction based on the second operation is generated when the first judgment result indicates that the second operation satisfies the first preset rule. The electronic device is controlled according to the second executable instruction to exit the first interface or a first application program corresponding to the first interface, so that the electronic device returns to an upper-level interface corresponding to the current first interface.

A second executable instruction based on the second operation is generated when the first judgment result indicates that the second operation does not satisfy the first preset rule. The electronic device is instructed according to the second executable instruction to display the first main interface.

Further, when the first judgment result indicates that the second operation does not satisfy the first preset rule but satisfies the preset condition, the second operation is similar to the first operation. Therefore, the first key performs a home function, i.e., the electronic device displays the first main interface in the display area thereof according to the second executable instruction.

Further, when the second operation neither satisfies the first preset rule nor satisfies the preset condition, the electronic device shields the second operation.

In a preferable embodiment, as the first key has both the home function and the back function, the surface of body of the electronic device which performs the touch method may only have the first key and the second key.

The first key in the touch method according to the embodiment of the present disclosure firstly has a home function. That is, the first key can respond to the first operation, and generate a first executable instruction based on the first operation, so that the electronic device displays, according to the first executable instruction, a preset first main interface in the display area thereof. Secondly, the first key further has a back function. That is, the first key can respond to the second operation, and generate a second executable instruction based on the second operation, so that the electronic device performs an interface switching operation according to the second executable instruction. Therefore, the touch method according to the embodiment of the present disclosure can integrate the home function and the back function in the same key, i.e., the first key. Thus, a user of the electronic device can perform different application functions only by performing different touch operations or the same touch operation on the first key. In this way, the touch method according to the present embodiment can ensure that all operations are uniformly performed on the first key as much as possible, thereby improving user experience.

In addition, when the first key is a physical key, as the first key has both a home function and a back function, the electronic device which performs the touch method according to the embodiment of the present disclosure needs not to be individually arranged with a key having a back function. Thus, compared with the existing electronic devices having many physical keys, the whole structure of the electronic device which performs the touch method according to the embodiment of the present disclosure has a high intensity, and the risk in a fault occurring in the body of the electronic device is low, which can be the basis for improving the comfort degree of user's operation on the electronic device, and achieves indistinctive operating experience, thereby further improving the user experience.

Twenty-sixth Embodiment

Figure 22:
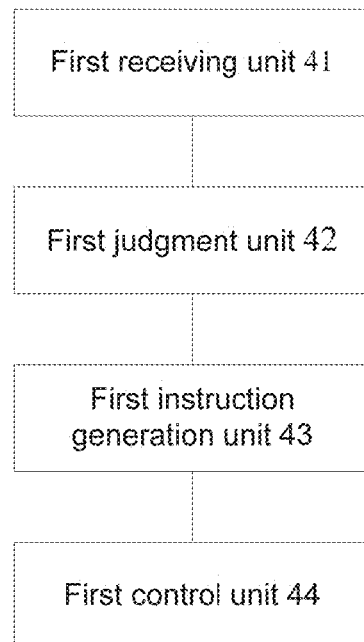
FIG. 22 is a fourth functional block diagram of an electronic device according to an embodiment of the present disclosure.
Figure 23:
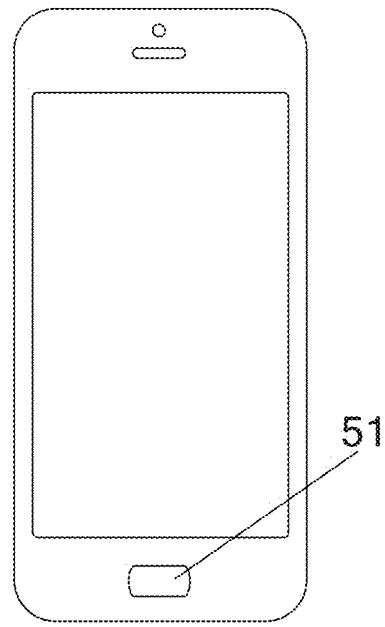
FIG. 23 is a fifth structural diagram of an electronic device according to an embodiment of the present disclosure.

FIG. 22 is a fourth functional bock diagram of an electronic device according to an embodiment of the present disclosure. FIG. 23 is a fifth structural diagram of an electronic device according to an embodiment of the present disclosure. As shown in FIGS. 22 and 23, the electronic device comprises a first key 51 arranged in a first position of the electronic device. The first key 51 can enable, in response to a first operation, the electronic device to generate a first executable instruction based on the first operation, so as to instruct the electronic device to display a first main interface through the first executable instruction. The first key 51 is a physical key or a virtual key which can enable the electronic device to perform the first executable instruction based on the first operation. The electronic device further comprises: a first receiving unit 41 configured to receive a second operation via the first key when the electronic device displays a first interface of a first application program; a first judgment unit 42 configured to judge whether the second operation satisfies a first preset rule to acquire a first judgment result; a first instruction generation unit 43 configured to generate, according to the first judgment result, a second executable instruction based on the second operation; and a first control unit 44 configured to control, according to the second executable instruction, the electronic device to perform an interface switching operation corresponding to the second executable instruction.

In the above solution, the first control unit 44 is further configured to control, according to the second executable instruction, the electronic device to exit the first interface or the first application program corresponding to the first interface, so that the electronic device returns to an upper-level interface corresponding to the current first interface, or instruct, according to the second executable instruction, the electronic device to display the first main interface.

In a preferable embodiment, as the first key has both the home function and the back function, the surface of the body of the electronic device can only have the first key.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which implement the functions according to the embodiment of the present disclosure, or may also be achieved by executing software which implements the functions according to the embodiment of the present disclosure on an intelligent terminal.

Twenty-seventh Embodiment

The electronic device according to the present embodiment is based on the electronic device according to the twenty-sixth embodiment. In the present embodiment, the first instruction generation unit 43 is further configured to generate the second executable instruction based on the second operation when the first judgment result indicates that the second operation satisfies the first preset rule.

Correspondingly, the first control unit 44 is further configured to control, according to the second executable instruction, the electronic device to exit the first interface or the first application program corresponding to the first interface so that the electronic device returns to an upper-level interface corresponding to the current first interface.

In the present embodiment, the first instruction generation unit 43 is further configured to generate the second executable instruction based on the second operation when the first judgment result indicates that the second operation does not satisfy the first preset rule.

Correspondingly, the first control unit 44 is further configured to instruct, according to the second executable instruction, the electronic device to display the first main interface.

Twenty-eighth Embodiment

Figure 24:
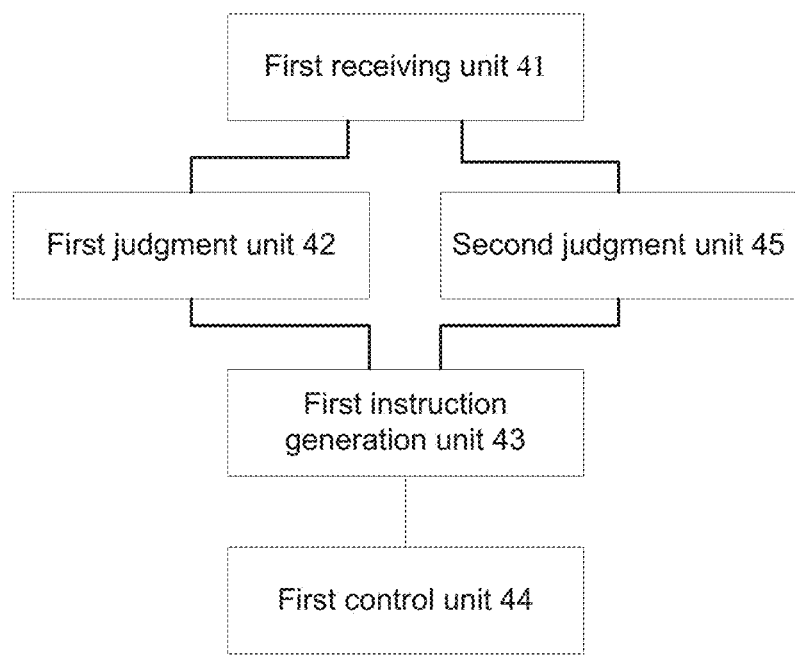
FIG. 24 is a fifth functional block diagram of an electronic device according to an embodiment of the present disclosure.

FIG. 24 is a fifth functional bock diagram of an electronic device according to an embodiment of the present disclosure. As shown in FIGS. 23 and 24, the electronic device comprises a first key 51 arranged in a first position of the electronic device. The first key 51 can enable, in response to a first operation, the electronic device to generate a first executable instruction based on the first operation, so as to instruct the electronic device to display a first main interface through the first executable instruction. The first key 51 is a physical key or a virtual key which can enable the electronic device to perform the first executable instruction based on the first operation. The electronic device further comprises: a first receiving unit 41 configured to receive a second operation via the first key when the electronic device displays a first interface of a first application program; a first judgment unit 42 configured to judge whether the second operation satisfies a first preset rule to acquire a first judgment result; a first instruction generation unit 43 configured to generate, according to the first judgment result, a second executable instruction based on the second operation; and a first control unit 44 configured to control, according to the second executable instruction, the electronic device to perform an interface switching operation corresponding to the second executable instruction.

In the above solution, the first control unit 44 is further configured to control, according to the second executable instruction, the electronic device to exit the first interface or the first application program corresponding to the first interface, so that the electronic device returns to an upper-level interface corresponding to the current first interface, or instruct, according to the second executable instruction, the electronic device to display the first main interface.

The electronic device further comprises a second judgment unit 45 configured to judge whether the first application program satisfies a second preset rule to acquire a second judgment result. Correspondingly, the first instruction generation unit 43 is further configured to generate, according to the first judgment result and the second judgment result, the second executable instruction based on the second operation.

In the above solution, the first instruction generation unit 43 is further configured to generate the second executable instruction based on the second operation when the first judgment result indicates that the second operation satisfies the first preset rule and when the first application program satisfies the second preset rule.

Correspondingly, the first control unit 44 is further configured to instruct the electronic device, according to the second executable instruction, to display the first main interface.

In the above solution, the first instruction generation unit 43 is further configured to generate the second executable instruction based on the second operation when the first judgment result indicates that the second operation satisfies the first preset rule and when the first application program does not satisfy the second preset rule.

Correspondingly, the first control unit 44 is further configured to control, according to the second executable instruction, the electronic device to exit the first interface or the first application program corresponding to the first interface, so that the electronic device returns to an upper-level interface corresponding to the current first interface.

In a preferable embodiment, as the first key has both the home function and the back function, the surface of the body of the electronic device can only have the first key.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which perform the functions according to the embodiment of the present disclosure, or may also be achieved by executing software which performs the functions according to the embodiment of the present disclosure on an intelligent terminal.

Twenty-ninth Embodiment

Figure 25:
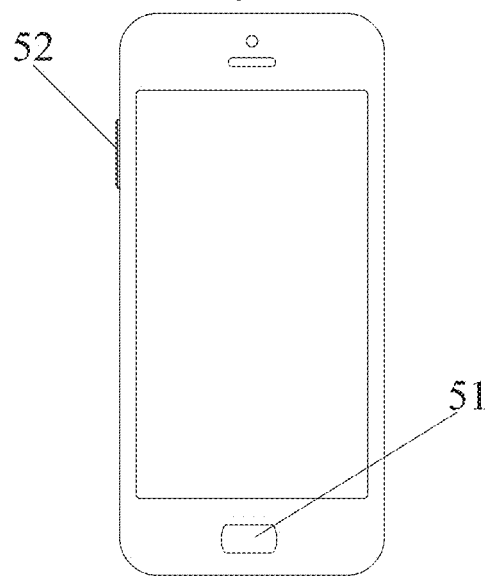
FIG. 25 is a sixth structural diagram of an electronic device according to an embodiment of the present disclosure.

FIG. 25 is a sixth structural diagram of an electronic device according to an embodiment of the present disclosure. As shown in FIG. 25, the electronic device comprises a first key and a second key. The first key is arranged in a first position of the electronic device and the second key is arranged in a second position of the electronic device. The first key can enable, in response to a first operation, the electronic device to generate a first executable instruction based on the first operation, so as to instruct the electronic device to display a first main interface through the first executable instruction. The first key is a physical key or a virtual key which can enable the electronic device to perform the first executable instruction based on the first operation. The second key is a physical key which can adjust a first functional parameter of the electronic device.

The electronic device further comprises a second receiving unit configured to receive a second operation via the first key when the electronic device displays a first interface of a first application program; a third judgment unit configured to judge whether the second operation satisfies a first preset rule to acquire a first judgment result; a second instruction generation unit configured to generate, according to the first judgment result, a second executable instruction based on the second operation; and a second control unit configured to control, according to the second executable instruction, the electronic device to perform an interface switching operation corresponding to the second executable instruction.

Correspondingly, the first control unit is further configured to control, according to the second executable instruction, the electronic device to exit the first interface or the first application program corresponding to the first interface, so that the electronic device returns to an upper-level interface corresponding to the current first interface.

In a preferable embodiment, as the first key has both the home function and the back function, the surface of the body of the electronic device can only have the first key and the second key.

Those skilled in the art should understand that functions of various processing units in the electronic device according to the embodiment of the present disclosure can be understood with reference to the related description of the touch method described above. The various processing units in the electronic device according to the embodiment of the present disclosure can be achieved by analog circuits which perform the functions according to the embodiment of the present disclosure, or may also be achieved by executing software which performs the functions according to the embodiment of the present disclosure on an intelligent terminal.

It should be understood that the devices and methods disclosed in the embodiments of the present disclosure may be implemented in other manners. The device implementations as described above are merely illustrative. For example, the division of the units is merely a logically functional division, and in practice, there may be other division manners. For example, multiple units or components may be combined or may be integrated into another system, or some features may be ignored or may not be implemented. In addition, various constituent parts, which are displayed or discussed as being coupled or communicatively connected directly, may also be coupled or communicatively connected indirectly via some interfaces, devices or units in an electrical manner, a mechanical manner, or other manners.

The above units described as separate components may be or may not be separated physically. The components displayed as units may be or may not be physical units, i.e., they may be located in a place or may also be distributed among multiple network units. A part or all of the units may be selected as needed to achieve the purpose of the solutions of the embodiments.

In addition, various functional units according to the embodiments of the present disclosure may all be integrated into a processing module, or various units may be used separately, or two or more units are integrated into a unit. The above integrated units may be implemented by hardware or by hardware and software functional units.

A person having ordinary skill in the art can understand that all or a part of steps for implementing the above method embodiments may be implemented by programs instructing related hardware. The programs above may be stored in a computer readable storage medium. When the programs are executed, the steps of the above method embodiments are implemented. The storage medium above may be a medium which can store program codes, such as a mobile storage device, a Read-Only Memory (ROM), a Random Access Memory (RAM), a disk, or a disc etc.

Alternatively, the integrated unit according to the present disclosure may also be stored in a computer readable storage medium when it is implemented in a form of software functional module and is sold or used as an independent product. Based on this understanding, the substance of the technical solutions according to the embodiments of the present disclosure or portions of the technical solutions which contribute to the related art may be embodied in a form of software product. The computer software product is stored in a storage medium, including a number of instructions to enable a computer device (which may be a personal computer, a server, or a network device or the like) to perform all or a part of the methods according to various embodiments of the present disclosure. The storage medium described above may be a medium which can store program codes, such as a mobile storage device, a Read-Only Memory (ROM), a Random Access Memory (RAM), a disk, or a disc or the like.

The above description is merely specific embodiments of the present disclosure, and the scope of the present disclosure is not limited thereto. Changes or substitutions, which can be obviously envisaged by those skilled persons in the art, should be included in the scope of the present disclosure without departing the scope defined by the appended claims. Therefore, the protection scope of the present disclosure should be defined by the claims.

I claim:

1. A touch method applied in an electronic device having a first key arranged at a first position of the electronic device, the first key being operable to respond to a first operation to control the electronic device to generate a first executable instruction based on the first operation for instructing the electronic device to display a first main interface through the first executable instruction, the method comprising:

receiving a second operation via the first key when the electronic device displays a first interface of a first application program;

acquiring data information corresponding to the second operation, the data information representing data information corresponding to movement parameters of the second operation;

determine current posture information of the electronic device;

acquiring a first judgment result based on the data information and the posture information; and adjusting, according to the first judgment result, a first functional parameter of the electronic device, so that the adjusted first functional parameter corresponds to the first judgment result, wherein the manner of adjusting the first functional parameter when a first movement direction of the second operation relative to the electronic device and a first posture of the electronic device are determined is identical to the manner of adjusting the first functional parameter when a second movement direction of the second operation relative to the electronic device, which is opposite to the first movement direction, and a second posture of the electronic device, which is opposite to the second posture, are determined.

2. The method according to claim 1, wherein said adjusting the first functional parameter of the electronic device according to the first judgment result comprises:
adjusting the first functional parameter in a first adjustment mode when the first judgment result indicates that a movement direction in the movement parameters of the second operation which are represented by the data information is a first preset direction or a third preset direction relative to the electronic device, wherein the electronic device is in a posture corresponding to the posture information.

3. The method according to claim 2, wherein, if the first judgment result indicates that the movement direction in the movement parameters of the second operation which are represented by the data information is a first direction or a third direction and the electronic device is correspondingly in a first posture or a second posture corresponding to the posture information, the first direction or the third direction relative to the electronic device in the first posture or the second posture is correspondingly determined as the first preset direction or the third preset direction.

4. The method according to claim 1, wherein said adjusting the first functional parameter of the electronic device according to the first judgment result comprises:
adjusting the first functional parameter in a second adjustment mode when the first judgment result indicates that a movement direction in the movement parameters of the second operation which are represented by the data information is a second preset direction or a fourth preset direction relative to the electronic device, wherein the electronic device is in a posture corresponding to the posture information.

5. The method according to claim 4, wherein, if the first judgment result indicates that the movement direction in the movement parameters of the second operation which are represented by the data information is a second direction or a fourth direction and the electronic device is correspondingly in a first posture or a second posture corresponding to the posture information, the second direction or the fourth direction relative to the electronic device in the first posture or the second posture is correspondingly determined as the second preset direction or the fourth preset direction.

6. The method according to claim 4, further comprising:
determining, according to the data information, a first displacement formed by the second operation on the first key, and a first speed of the second operation relative to the first key;
judging whether the first displacement and the first speed satisfy a first preset rule to acquire a first judgment result; and
adjusting the first functional parameter in the second adjustment mode according to the first judgment result.

7. The method according to claim 6, wherein adjusting the first functional parameter in the second adjustment mode according to the first judgment result comprises:
adjusting, according to the first judgment result, the first functional parameter to a first value in the second adjustment mode within a preset period of time when the first judgment result indicates that the first displacement and the first speed satisfy the first preset rule.

8. The method according to claim 2, further comprising:
determining, according to the data information, a second displacement formed by the second operation on the first key; and determining a first adjustment amplitude corresponding to the second displacement;
wherein adjusting the first functional parameter in the first adjustment mode comprises adjusting the first functional parameter with the first adjustment amplitude in the first adjustment mode.

9. An electronic device, comprising:
a first key arranged at a first position of the electronic device, the first key being operable to sense a touch operation; and
a second key arranged at a second position of the electronic device, the second key being operable to adjust a first functional parameter of the electronic device,
wherein only the first key and the second key are arranged on a surface of the body of the electronic device,
a processor,
a memory configured to store instructions which, when executed by the processor, causes the processor to:
receive a second operation via the first key;
acquire data information corresponding to the second operation, the data information representing data information corresponding to movement parameters of the second operation;
determine current posture information of the electronic device;
acquire a first judgment result based on the data information and the posture information; and
adjust, according to the first judgment result, the first functional parameter of the electronic device, so that the adjusted first functional parameter corresponds to the first judgment result,
wherein the manner of adjusting the first functional parameter when a first movement direction of the second operation relative to the electronic device and a first posture of the electronic device are determined is identical to the manner of adjusting the first functional parameter when a second movement direction of the second operation relative to the electronic device, which is opposite to the first movement direction, and a second posture of the electronic device, which is opposite to the second posture, are determined.

10. The electronic device according to claim 9, wherein a first touch sensing region is arranged in the first key, and the electronic device is operable to respond to the touch operation via the first touch sensing region.

11. The electronic device according to claim 9, wherein the first key is arranged at a first position on a first surface of the electronic device, the first surface being a surface in which the display area of the electronic device is located, the first position being a position corresponding to at least a part of the first surface excluding the display area, and the first key being concave relative to the first surface.

12. The electronic device according to claim 9, wherein a physiological feature collection unit is integrated in the first key, and the electronic device is operable to collect physiological feature parameters of an operating body corresponding to the touch operation through the physiological feature collection unit.

13. An electronic device, comprising:
a first key arranged at a first position of the electronic device, the first key is operable to respond to a first operation to control the electronic device to generate a first executable instruction based on the first operation for instructing the electronic device to display a first main interface through the first executable instruction; and a processor configured to:
  receive a second operation via the first key when the electronic device displays a first interface of a first application program;
  acquire data information corresponding to the second operation, the data information representing data information corresponding to movement parameters of the second operation;
  determine current posture information of the electronic device;
  acquire a first judgment result based on the data information and the posture information; and
  adjust, according to the first judgment result, a first functional parameter of the electronic device, so that the adjusted first functional parameter corresponds to the first judgment result,
wherein the manner of adjusting the first functional parameter when a first movement direction of the second operation relative to the electronic device and a first posture of the electronic device are determined is identical to the manner of adjusting the first functional parameter when a second movement direction of the second operation relative to the electronic device, which is opposite to the first movement direction, and a second posture of the electronic device, which is opposite to the second posture, are determined.

* * * * *